(12) United States Patent
Asano et al.

(10) Patent No.: US 11,344,811 B2
(45) Date of Patent: May 31, 2022

(54) COMPUTER-READABLE RECORDING MEDIUM, COMPUTER APPARATUS, AND METHOD OF PROGRESSING GAME

(71) Applicant: SQUARE ENIX CO., LTD., Tokyo (JP)

(72) Inventors: Tomoya Asano, Tokyo (JP); Masashi Takahashi, Tokyo (JP); Natsumi Miwa, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/026,768

(22) Filed: Sep. 21, 2020

(65) Prior Publication Data

US 2021/0086079 A1 Mar. 25, 2021

(30) Foreign Application Priority Data

Sep. 24, 2019 (JP) .............................. JP2019-173558

(51) Int. Cl.
*A63F 13/58* (2014.01)
*A63F 13/537* (2014.01)
*A63F 13/822* (2014.01)

(52) U.S. Cl.
CPC ............ *A63F 13/58* (2014.09); *A63F 13/537* (2014.09); *A63F 13/822* (2014.09)

(58) Field of Classification Search
None
See application file for complete search history.

(56) References Cited

U.S. PATENT DOCUMENTS

| 6,273,822 B1* | 8/2001 | Tanaka | A63F 13/10 |
| | | | 463/43 |
| 6,758,756 B1* | 7/2004 | Horigami | A63F 13/814 |
| | | | 463/43 |
| 10,653,961 B2* | 5/2020 | Matsushita | A63F 13/58 |
| 2002/0142833 A1 | 10/2002 | Tsuchida et al. | |
| 2014/0302923 A1* | 10/2014 | Sato | A63F 13/30 |
| | | | 463/31 |
| 2015/0238862 A1 | 8/2015 | Suzuki | |
| 2019/0299096 A1 | 10/2019 | Suzuki | |

(Continued)

FOREIGN PATENT DOCUMENTS

| JP | 2002-292136 | 10/2002 |
| JP | 2003-019351 | 1/2003 |

(Continued)

OTHER PUBLICATIONS

Office Action from Japan Patent Office (JPO) in Japanese Patent Appl. No. 2019-173558, dated May 11, 2021, together with an English language translation.

(Continued)

*Primary Examiner* — Ronald Laneau
(74) *Attorney, Agent, or Firm* — Greenblum & Bernstein, P.L.C.

(57) ABSTRACT

To provide a game program having sufficient strategy and taste.
A game program progresses a game by calculating a sequence of actions of the plurality of characters when an action of a character is determined from the plurality of options, receiving determination of the action of the character, and causing the character to execute the action received.

20 Claims, 19 Drawing Sheets

(56) References Cited

U.S. PATENT DOCUMENTS

2020/0086218 A1* 3/2020 Nakano .................. A63F 13/35
2020/0094142 A1 3/2020 Suzuki

FOREIGN PATENT DOCUMENTS

| JP | 2015-142628 | 8/2015 |
| JP | 2015-157002 | 9/2015 |
| JP | 6243490 | 12/2017 |
| JP | 6328839 | 5/2018 |
| JP | 2019-126482 | 8/2019 |

OTHER PUBLICATIONS

[Octopath Traveler Review] A flexibility in the game and evolutionary formed battles from classic RPGs are attractive, AppBank[online], Jul. 1, 2018, [search on Apr. 22, 2021], Internet <URL:https://www.appbank.net/2018/07/01/consumer/1570102.php>, together with a partial English language translation.

Office Action from Japan Patent Office (JPO) in Japanese Patent Appl. No. 2019-173558, dated Sep. 15, 2020, together with a partial English language translation.

* cited by examiner

FIG. 8

BASIC ACTION VALUE MASTER TABLE

| CHARACTER | BASIC ACTION VALUE |
|---|---|
| ALLY CHARACTER a | 10 |
| ALLY CHARACTER b | 23 |
| ENEMY CHARACTER a | 20 |

FIG. 9

NUMBER OF ACTION SELECTABLE MASTER TABLE

| CHARACTER | NUMBER OF ACTION SELECTABLE |
|---|---|
| ALLY CHARACTER a | 2 |
| ALLY CHARACTER b | −1 |
| ENEMY CHARACTER a | 0 |

FIG. 11

ACTION ORDER INFLUENCE VALUE MASTER TABLE

| ACTION TYPE | ACTION ORDER INFLUENCE VALUE |
|---|---|
| FIGHT | 2 |
| LETHAL MOVE | 5 |
| RECOVERY MAGIC a | 2 |
| RECOVERY MAGIC b | 3 |
| ATTACK MAGIC a | 2 |
| ATTACK MAGIC b | 3 |
| DEFAULT | 1 |
| ITEM | 2 |

FIG. 12

ACCUMULATED NUMBER OF ACTION DATA TABLE

| CHARACTER | ACTION TYPE | ACCUMULATED NUMBER OF ACTION |
|---|---|---|
| ALLY CHARACTER a | FIGHT | 1 |
| ALLY CHARACTER b | RECOVERY MAGIC | 2 |
| ALLY CHARACTER a | LETHAL MOVE | 3 |
| ... | ... | ... |
| | | |
| | | |

FIG. 13

EFFECT ADDITION MASTER TABLE

| ACCUMULATED NUMBER OF ACTION | EFFECT TO BE ADDED |
|---|---|
| 1 | 0% |
| 2 | 10% |
| 3 | 20% |
| 4 | 30% |
| 5 | 40% |
| 6 | 50% |
| 7 | 60% |
| 8 | 70% |
| 9 | 80% |
| 10 | 90% |
| 11 | 100% |

GAME SYSTEM

COMPUTER-READABLE RECORDING MEDIUM, COMPUTER APPARATUS, AND METHOD OF PROGRESSING GAME

CROSS REFERENCE TO RELATED APPLICATION

The present disclosure relates to subject matter contained in Japanese Patent Application No. 2019-173558, filed on Sep. 24, 2019, the disclosure of which is expressly incorporated herein by reference in its entirety.

TECHNICAL FIELD

The present invention relates to a non-transitory computer-readable recording medium, a computer apparatus, and a method of progressing game.

BACKGROUND ART

In the related art, there is a game that proceeds by determining the actions of a plurality of characters from a plurality of options.

SUMMARY OF INVENTION

Technical Problem

In the above-described game in the related art, for example, when selecting an action of a character, the next sequence of action of the character is not clearly indicated, and it is difficult to determine which action to be selected will make the next order of action earlier and cause the game to advantageously proceed. In addition, it is not clearly indicated how advantageous it is to run a game in consideration of the sequence of action, and it does not provide the player with sufficient strategy and taste.

An object of at least one embodiment of the present invention is to provide a game program having sufficient strategy and taste.

Solution to Problem

According to a non-limiting aspect, a non-transitory computer-readable recording medium including a game program that causes a computer apparatus to execute a game that proceeds by determining actions of a plurality of characters from a plurality of options, the game program causing the computer apparatus to function as: a sequence of action calculator that calculates a sequence of actions of the plurality of characters when an action of a character is determined from the plurality of options; an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

According to a non-limiting aspect, a computer apparatus including: a sequence of action calculator that calculates a sequence of actions of a plurality of characters when an action of a character is determined from a plurality of options, an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

According to a non-limiting aspect, a proceeding method of a game that is executed in a computer apparatus and proceeds by determining actions of a plurality of characters from a plurality of options, the method including: calculating a sequence of actions of the plurality of characters when an action of a character is determined from the plurality of options; receiving the determination of the action of the character; and causing the character to execute the received action, according to the calculated sequence of actions, wherein in the calculating the sequence of actions, when one action of the character is determined from the plurality of options, the sequence of actions including a next action of the one action of the character is calculated such that an order of action of the next action differs, according to the one action.

Advantageous Effects of Invention

One or more of the above problems can be solved with each embodiment of the present invention.

BRIEF DESCRIPTION OF THE DRAWINGS

FIG. 8 is a diagram showing a basic action value master table corresponding to at least one of the embodiments of the present invention.

FIG. 9 is a diagram showing a number of action selectable master table corresponding to at least one of the embodiments of the present invention.

FIG. 11 is a diagram showing an action order influence value master table corresponding to at least one of the embodiments of the present invention.

FIG. 12 is a diagram showing an accumulated number of action data table corresponding to at least one of the embodiments of the present invention.

FIG. 13 is a diagram showing an effect addition master table corresponding to at least one of the embodiments of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
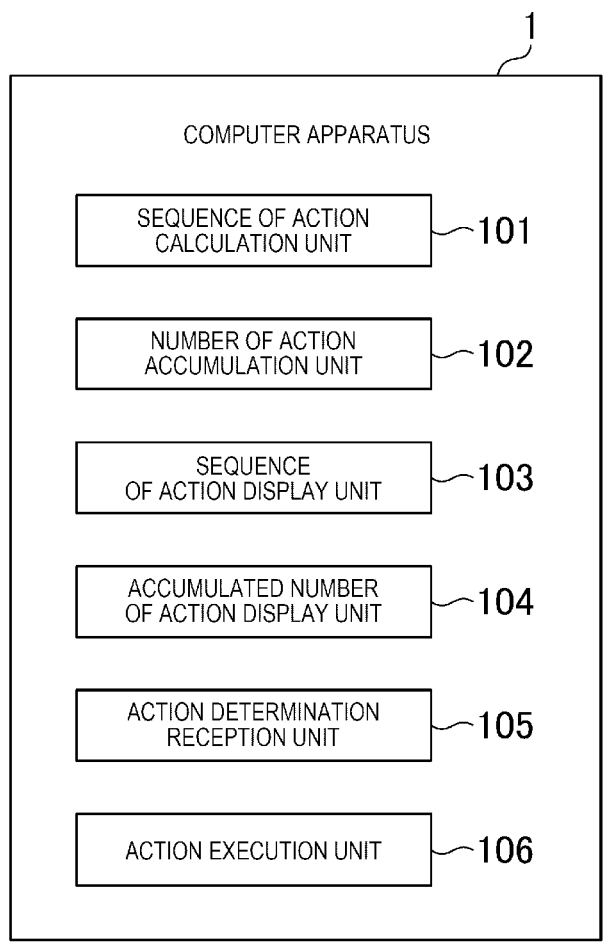
FIG. 1 is a block diagram showing a configuration of a computer apparatus corresponding to at least one of the embodiments of the present invention.

An outline of a first embodiment of the present invention will be described. FIG. 1 is a block diagram showing a configuration of a computer apparatus corresponding to at least one of the embodiments of the present invention. A computer apparatus 1 includes at least a sequence of action calculation unit 101, a number of action accumulation unit 102, a sequence of action display unit 103, an accumulated number of action display unit 104, an action determination reception unit 105, and an action execution unit 106.

The sequence of action calculation unit 101 has a function of calculating the sequence of actions of a plurality of characters when the actions of the characters are determined from a plurality of options. The number of action accumulation unit 102 has a function of accumulating the number of actions satisfying a first predetermined condition when the actions of the characters are determined from the plurality of options. The sequence of action display unit 103 has a function of displaying the sequence of actions of the plurality of characters calculated by the sequence of action calculation unit 101. The accumulated number of action display unit 104 has a function of displaying the accumulated number of actions that satisfy the first predetermined condition accumulated by the number of action accumulation unit 102. The action determination reception unit 105 has a function of receiving determination of the actions of the characters. The action execution unit 106 has a function of causing the character to execute the action received by the action determination reception unit 105 according to the sequence of actions calculated by the sequence of action calculation unit 101.

Figure 2:
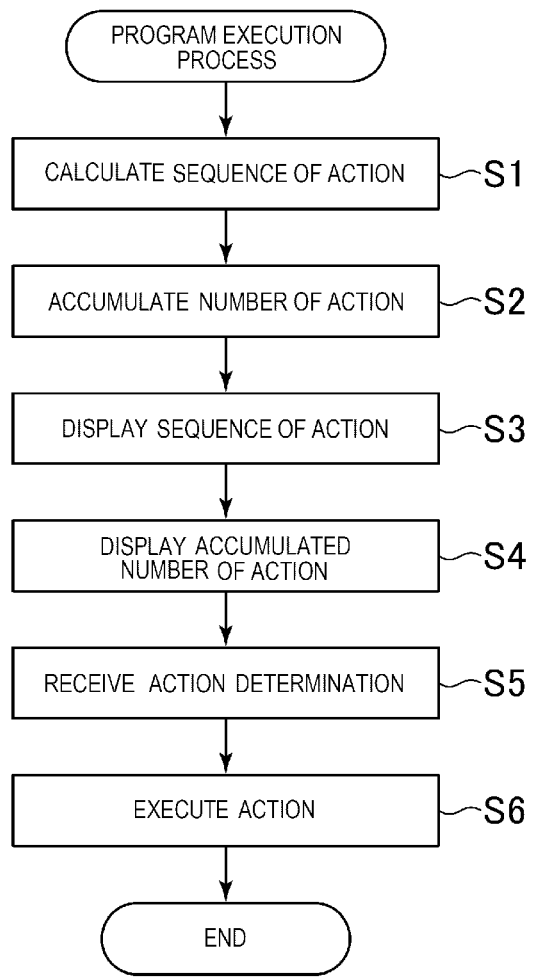
FIG. 2 is a flowchart of a program execution process corresponding to at least one of the embodiments of the present invention.

A program execution process according to the first embodiment of the present invention will be described. FIG. 2 is a flowchart of a program execution process corresponding to at least one of the embodiments of the present invention.

First, the computer apparatus 1 calculates the sequence of actions of the plurality of characters when the action of the character is determined from the plurality of options (step S1). Then, the computer apparatus 1 accumulates the number of times of the actions satisfying a first predetermined condition when the action of the character is determined from the plurality of options (step S2). Next, the computer apparatus 1 displays the sequence of actions of the plurality of characters calculated in step S1 (step S3). Then, the computer apparatus 1 displays the accumulated number of actions satisfying the first predetermined condition, which is accumulated in step S2 (step S4). The computer apparatus 1 receives the determination of the action of the character (step S5). Then, the computer apparatus 1 causes the character to execute the action received in step S5 according to the sequence of action calculated in step S1 (step S6), and terminates the process.

As an aspect of the first embodiment, by calculating a sequence of actions of a plurality of characters when the actions of the characters are determined from a plurality of options, accumulating the number of times of the actions satisfying a first predetermined condition when the action of the character is determined from the plurality of options, displaying the calculated sequence of actions of the plurality of characters, displaying the accumulated number of actions satisfying the first predetermined condition, which is accumulated, receiving determination of the actions of the characters, and causing the character to execute the received action, according to the calculated sequence of actions, it is possible to provide a game program having sufficient strategy and taste.

In the first embodiment, the "character" means, for example, a person, an animal, a monster, a machine, or the like that appears in the game, and there are those who act according to the player's operation, those who act according to the operations of other players, those whose action is controlled by a program, or the like. In addition, characters are divided into a character who is a friend of the character operated by the player, a character who is an enemy of the character operated by the player, a character who takes a neutral position without being a friend or enemy of the character operated by the player, or the like.

In the first embodiment, the "action" means, for example, an action to be executed by the character, and more specifically, a normal attack, a lethal move, magic, use of an item, an escape, or the like.

In the first embodiment, the "computer apparatus" means, for example, a desktop or notebook personal computer, a tablet computer, a PDA, or the like, and may be a portable terminal of which display screen includes a touch panel sensor. The "game" means, for example, a computer game in which a game program is started up and executed in a computer apparatus, and the genre of the game content does not matter.

In the first embodiment, the "sequence of action" means, for example, an arrangement indicating an order in which a plurality of characters select or execute actions.

In the first embodiment, the "first predetermined condition" means, for example, a condition for classifying the actions of the characters, and more specifically, continuous execution of an action of an ally character without the action of the enemy character in between, continuous execution of an action of an ally character doing damage to an enemy character, or the like.

Second Embodiment

Next, an outline of the second embodiment of the present invention will be described. As the configuration of the computer apparatus in the second embodiment, the same configuration as that shown in the block diagram of FIG. 1 can be adopted. Further, as the flow of the program execution process in the second embodiment, the same configuration as that shown in the flowchart of FIG. 2 can be adopted.

In the second embodiment, the sequence of action calculation unit 101 has a function of calculating a sequence of actions including a next action of one action of the character, when the one action of the character is determined from the plurality of options, and the order of action of the next action differs according to the one action.

As one aspect of the second embodiment, when one action of the character is determined from the plurality of options, a sequence of actions including a next action of the one action of the character is calculated, and the order of action of the next action differs according to the one action, so that it is possible to provide a game having an increased strategy in the action selection and higher taste.

In the second embodiment, as "character", "action", "computer apparatus", "game", "sequence of action", and "first predetermined condition", the contents described in the first embodiment can be adopted within a necessary range.

In the second embodiment, the "order of action" means, for example, the order of action, and more specifically, an order in which a character can act, while a plurality of characters act in order.

Third Embodiment

Figure 3:
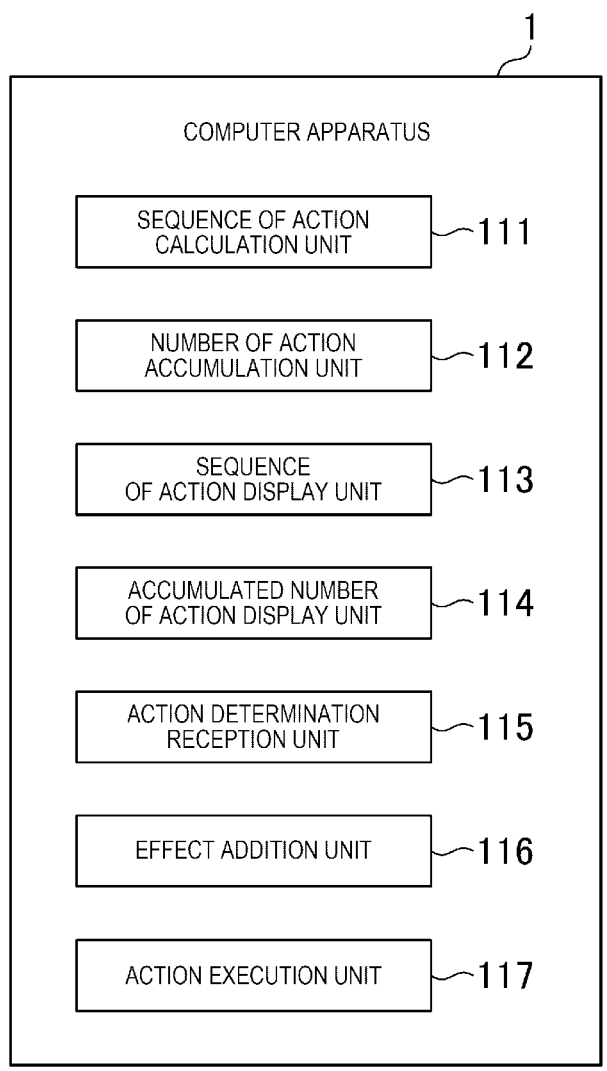
FIG. 3 is a block diagram showing a configuration of a computer apparatus corresponding to at least one of the embodiments of the present invention.

Next, an outline of the third embodiment of the present invention will be described. FIG. 3 is a block diagram showing a configuration of a computer apparatus corresponding to at least one of the embodiments of the present invention. The computer apparatus 1 includes at least a sequence of action calculation unit 111, a number of action accumulation unit 112, a sequence of action display unit 113, an accumulated number of action display unit 114, an action determination reception unit 115, an effect addition unit 116, and an action execution unit 117.

The sequence of action calculation unit 111 has a function of calculating the sequence of actions of a plurality of characters when the actions of the characters are determined from a plurality of options. The number of action accumulation unit 112 has a function of accumulating the number of actions satisfying a first predetermined condition when the actions of the characters are determined from the plurality of options. The sequence of action display unit 113 has a function of displaying the sequence of actions of the plurality of characters calculated by the sequence of action calculation unit 111. The accumulated number of action display unit 114 has a function of displaying the accumulated number of actions that satisfy the first predetermined condition accumulated by the number of action accumulation unit 112. The action determination reception unit 115 has a function of receiving determination of the actions of the characters. The effect addition unit 116 has a function of adding a predetermined effect, according to the accumulated number of actions satisfying the first predetermined condition. The action execution unit 117 has a function of causing the character to execute the action received by the action determination reception unit 115 according to the sequence of actions calculated by the sequence of action calculation unit 111.

Figure 4:
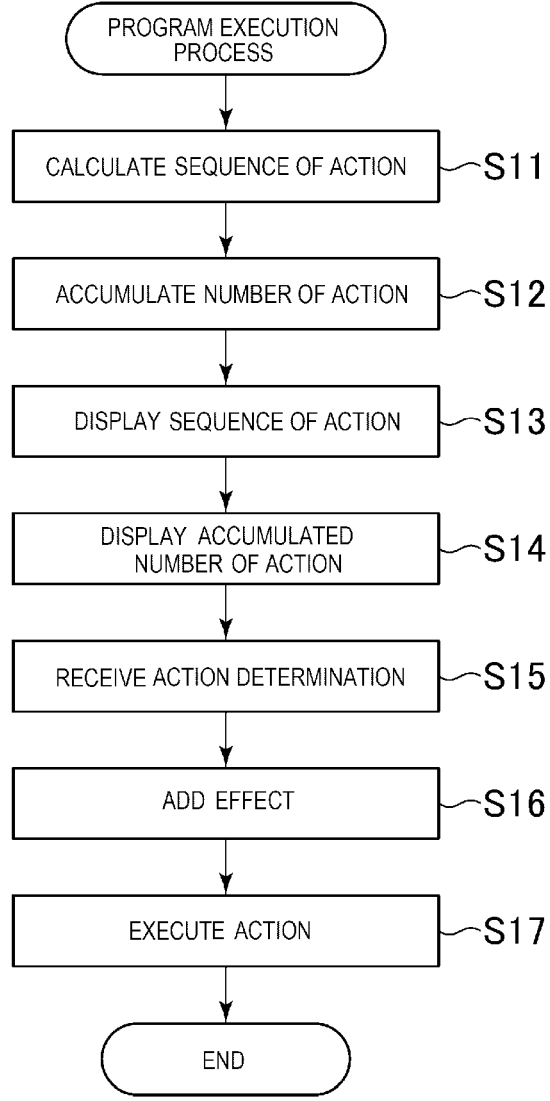
FIG. 4 is a flowchart of a program execution process corresponding to at least one of the embodiments of the present invention.

A program execution process according to the third embodiment of the present invention will be described. FIG. 4 is a flowchart of a program execution process corresponding to at least one of the embodiments of the present invention.

First, the computer apparatus 1 calculates the sequence of actions of the plurality of characters when the action of the character is determined from the plurality of options (step S11). Then, the computer apparatus 1 accumulates the number of times of the actions satisfying a first predetermined condition when the action of the character is determined from the plurality of options (step S12). Next, the computer apparatus 1 displays the sequence of actions of the plurality of characters calculated in step S11 (step S13). Then, the computer apparatus 1 displays the accumulated number of actions satisfying the first predetermined condition, which is accumulated in step S12 (step S14). The computer apparatus 1 receives the determination of the action of the character (step S15). Then, the computer apparatus 1 gives a predetermined effect according to the accumulated number of actions satisfying the first predetermined condition (step S16). Finally, the computer apparatus 1 causes the character to execute the action received in step S15, according to the sequence of action calculated in step S11 (step S17), and terminates the process.

According to one aspect of the third embodiment, a predetermined effect is added according to the accumulated number of action satisfying the first predetermined condition, so that it is motivated to select actions in consideration of the next sequence of actions, and the taste of the game can be improved.

In the third embodiment, as "character", "action", "computer apparatus", "game", "sequence of action", and "first predetermined condition", the contents described in the first embodiment can be adopted within a necessary range.

In the third embodiment, as the "order of action", the contents described in the second embodiment can be adopted within necessary ranges.

In the third embodiment, the "predetermined effect" is, for example, an effect added to the action or state of a character (including a player character, another player character, an enemy character, and a neutral character), and may be an effect that is advantageous or disadvantageous for the player character to win the virtual battle. More specifically, the predetermined effect is that the enemy character is greatly damaged when it is attacked, the recovery amount of the recovery magic which is executed on the ally character is increased, and the hit rate of the attack executed by the ally character is increased.

Fourth Embodiment

Figure 5:
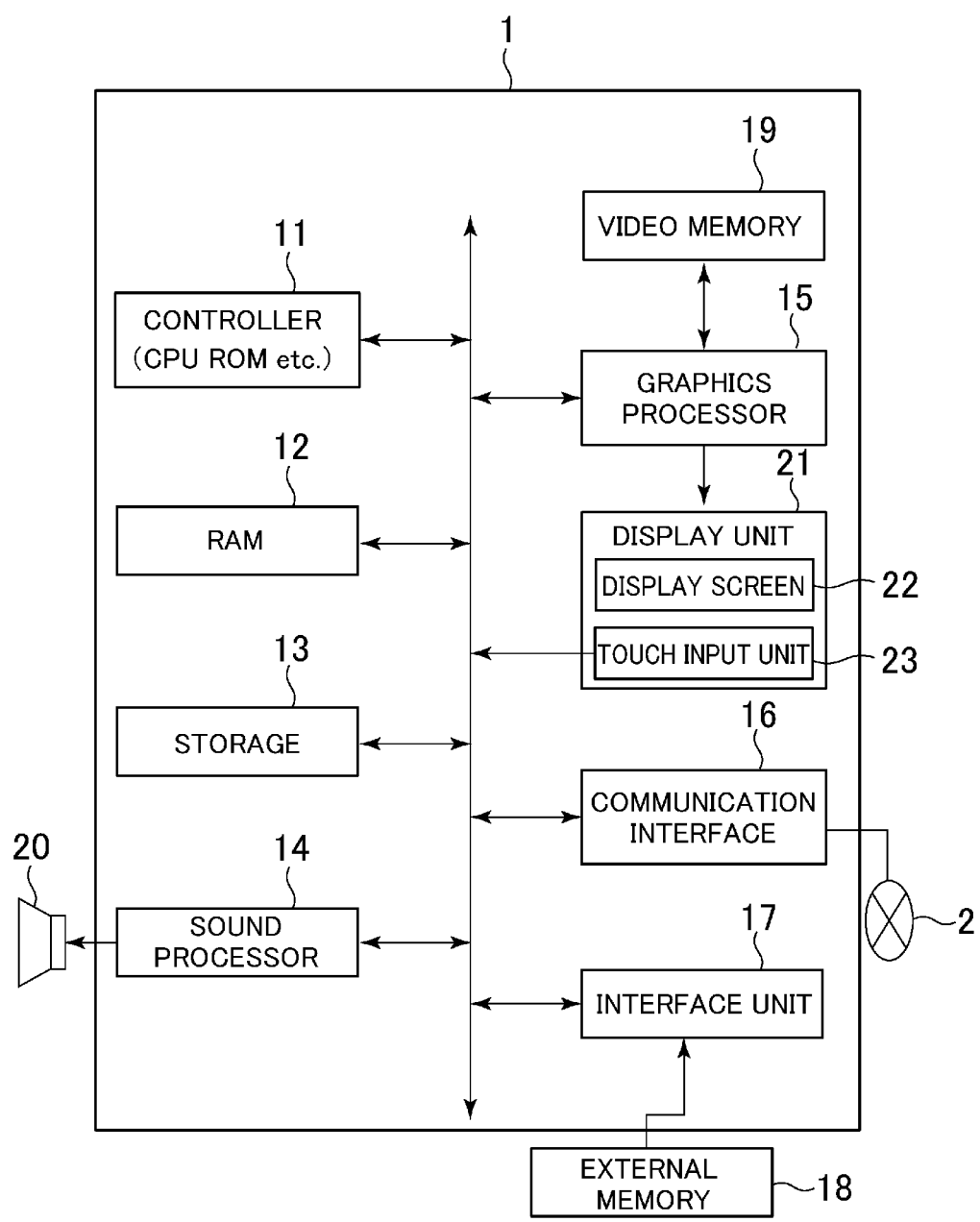
FIG. 5 is a block diagram showing a configuration of a computer apparatus corresponding to at least one of the embodiments of the present invention.

Next, an outline of the fourth embodiment of the present invention will be described. FIG. 5 is a block diagram showing a configuration of a computer apparatus corresponding to at least one of the embodiments of the present invention. The computer apparatus 1 includes a controller 11, a random access memory (RAM) 12, a storage 13, a sound processor 14, a graphics processor 15, a communication interface 16, and an interface unit 17, which are connected by an internal bus.

The controller 11 includes a central processing unit (CPU) and a read only memory (ROM). The controller 11 executes a program stored in the storage 13 and controls the computer apparatus 1. The RAM 12 is a work area of the controller 11. The storage 13 is a storage area for storing programs (including game programs) and data (including game data).

The controller 11 reads programs and data from the RAM 12 and executes processes. The controller 11 processes the program and data loaded in the RAM 12 to output a sound output instruction to the sound processor 14 and a drawing command to the graphics processor 15.

The sound processor 14 is connected to a sound output device 20, which is a speaker. When the controller 11 outputs a sound output instruction to the sound processor 14, the sound processor 14 outputs a sound signal to the sound output device 20.

The graphics processor 15 is connected to the display unit 21. The display unit 21 includes a display screen 22 and a touch input unit 23 that receives an input when the player touches the display screen. When the controller 11 outputs a drawing command to the graphics processor 15, the graphics processor 15 develops an image into a video memory (frame buffer) 19 and outputs a video signal for displaying the image on the display screen 22.

The touch input unit 23 may be a device capable of detecting a contact position by using any method such as a resistance film method, a capacitance method, an ultrasonic surface acoustic wave method, an optical method, or an electromagnetic induction method, which is used for a touch panel. The touch input unit 23 is a device capable of detecting the position of the finger or the like when the upper surface of the touch input unit 23 is pressed or moved with a finger or a stylus.

The graphics processor 15 executes drawing of one image in frame units. One frame time of an image is, for example, ⅓₀ second. The graphics processor 15 is responsible for a part of the arithmetic process relating to the drawing executed only by the controller 11, and has a role of distributing the load of the entire system.

An external memory 18 (for example, an SD card or the like) is connected to the interface unit 17. The data read from the external memory 18 is loaded into the RAM 12, and the controller 11 executes the arithmetic process.

The communication interface 16 can be connected to the communication network 2 wirelessly or by wire, and can receive data via the communication network 2. The data received via the communication interface 16 is loaded into the RAM 12 in the same manner as the data read from the external memory 18, and the arithmetic process is executed by the controller 11.

Outline of Game

In the fourth embodiment of the present invention, a game in which a plurality of enemy characters and an ally character execute virtual battle is exemplified. For example, the virtual battle may be started when the enemy character and the ally character come into contact with each other on a screen other than the virtual battle, may be accidentally started when the enemy character and the ally character are not in contact with each other on the screen other than the virtual battle, or may be started at a timing required in the story of the game. The virtual battle proceeds by determining the action of the character from a plurality of options. The condition for ending the virtual battle may be that all enemy characters and/or all ally characters are in a state where they cannot execute virtual battle, for example, that all enemy characters and/or all ally characters lose the physical strength, that all enemy characters and/or all ally characters are in a state where they cannot execute an action, or that a condition for ending the virtual battle in the story of the game is satisfied. The conditions for the player to win the virtual battle may be that all the enemy characters lose their physical strength, that all the enemy characters are incapable of executing actions, or that conditions for ending the virtual battle in the story of the game are satisfied. In addition, a state in which a specific character of the ally characters cannot execute virtual battle may be virtual battle end condition.

Figure 6:
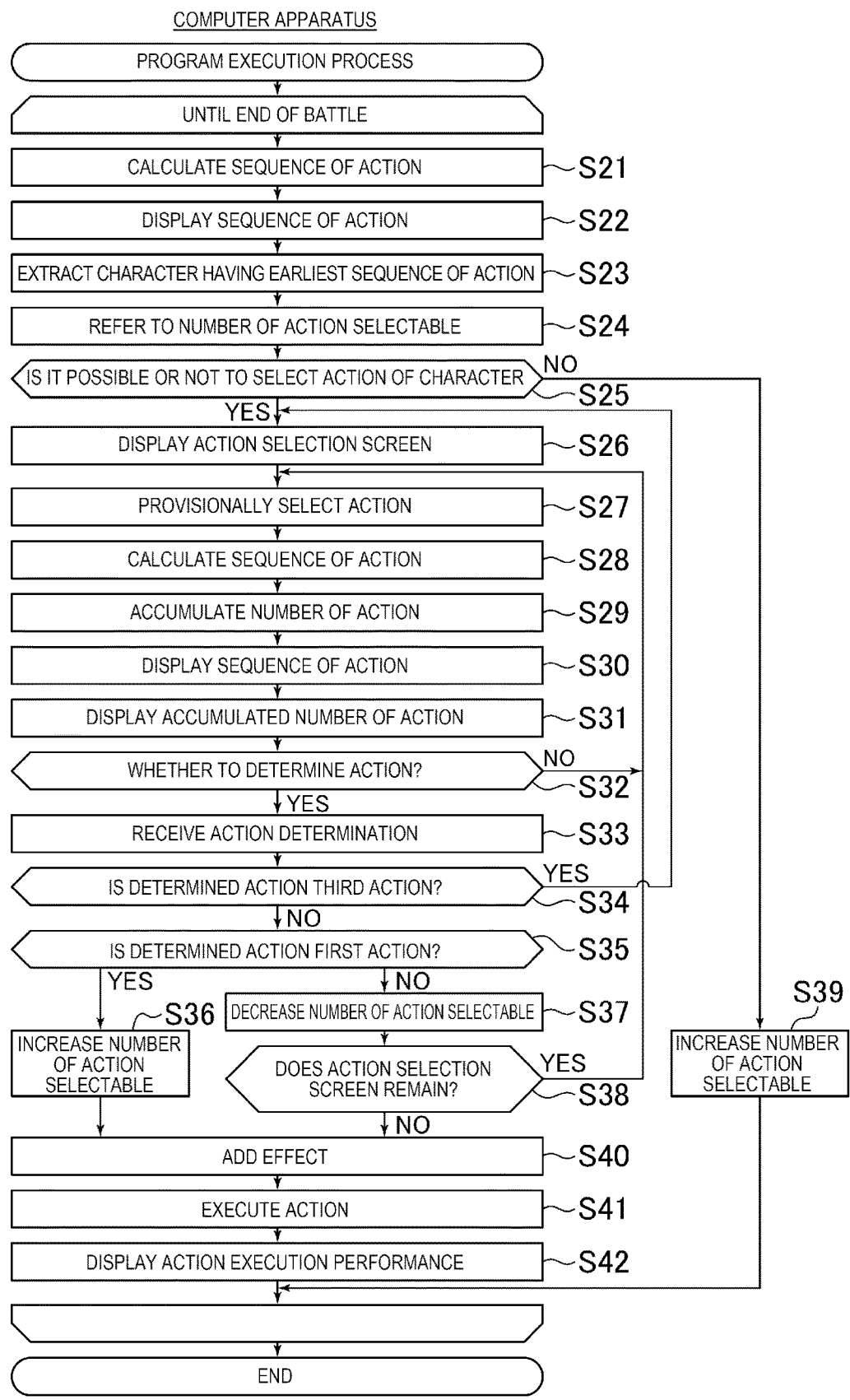
FIG. 6 is a flowchart of a program execution process corresponding to at least one of the embodiments of the present invention.
Figure 7:
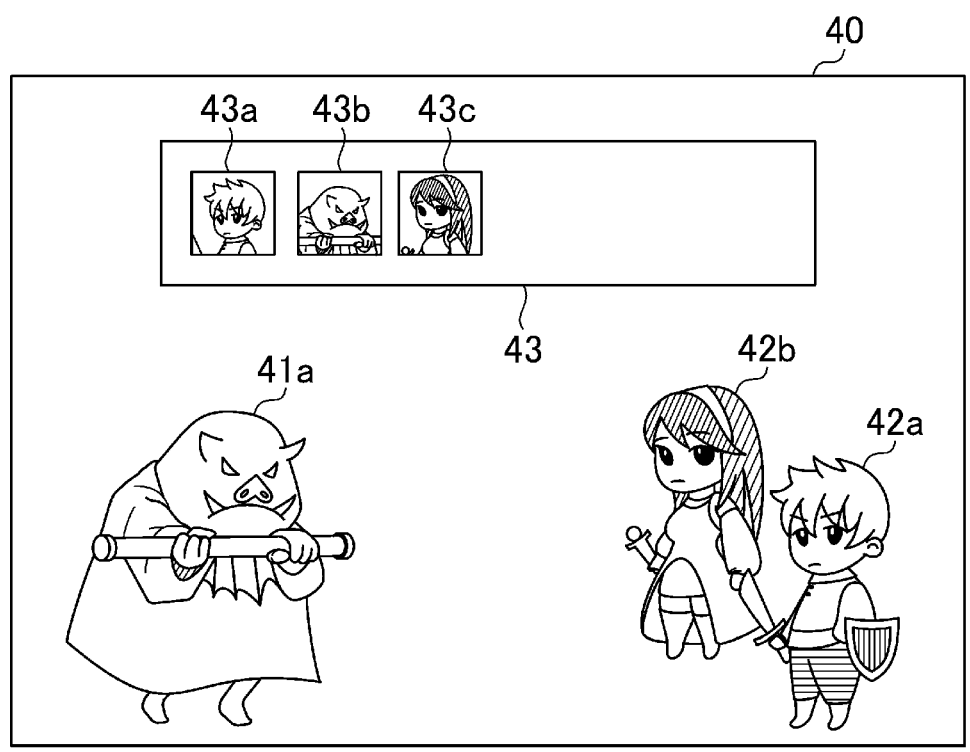
FIG. 7 is an example of a program execution screen, corresponding to at least one of the embodiments of the present invention.

FIG. 6 is a flowchart of a program execution process corresponding to at least one of the embodiments of the present invention. Further, FIG. 7 is an example of a program execution screen, corresponding to at least one of the embodiments of the present invention.

When the virtual battle is started, an execution screen 40 is displayed on the display screen 22 of the computer apparatus 1. On the execution screen 40, an enemy character 41, an ally character 42, and a sequence of action display portion 43 are displayed. Then, the sequence of action of the characters participating in the virtual battle is calculated (step S21). Next, the sequence of action display portion 43 displays the sequence of action of the characters participating in the virtual battle (step S22).

FIG. 8 is a diagram showing a basic action value master table corresponding to at least one of the embodiments of the present invention. In the basic action value master table 50, basic action values 52 are stored in association with the characters 51. In step S21, the basic action value master table 50 is referred to, and the basic action value of each character participating in the battle is specified. Then, the sequence of action of each character is calculated based on the specified basic action value. At this time, for example, the action may be sequentially selected from the character having the smallest basic action value which is specified. The basic action value may be set according to an element unique to the corresponding character. The unique element is, for example, status, attributes, equipment, and/or personal belongings of the character. More specifically, it may be "quickness", "equipment weight", "body weight", "occupation", "belonging", and the like of the character. In this way, since the sequence of action of the characters is calculated according to the element unique to the character, the actions of the characters participating in the virtual battle, which are executed within a predetermined period or a predetermined number of actions, are executed at different frequencies for respective characters.

The sequence of action of the characters participating in the battle calculated in step S21 is displayed on the sequence of action display portion 43 of the execution screen 40. In the sequence of action display portion 43, the sequence of action of the characters participating in the battle may be displayed as the appearance of the corresponding character, or as information other than the appearance, such as the name of the corresponding character. By checking the sequence of action display portion 43, the player can easily determine which character executes the action in the virtual battle in what order. For example, in FIG. 7, the sequence of actions of the characters participating in the virtual battle is displayed as icons representing the appearance of the corresponding characters. The icon 43a corresponds to the ally character 42a, the icon 43b corresponds to the enemy character 41a, and the icon 43c corresponds to the ally character 42b, and the action can be selected in order from the character corresponding to the icon displayed on the left side.

The number of icons displayed in the sequence of action display portion 43 may be equal to the number of characters participating in the battle, or may be a certain number regardless of the number of characters participating in the battle, and icons in the later sequence which are not normally displayed may be viewed by the operation of the player. Further, when displaying the icon, information about the state of the character may be displayed on or near the icon. The information about the state of the character means, for example, information related to the state of the character, and more specifically, information about a state where it is impossible to execute virtual battle, a state where it is not possible to select an action, a state of being poisoned, a state of being paralyzed, a state of being petrified, a state where attack power is increasing, or a state where defense power is increasing.

When the virtual battle proceeds and it becomes impossible to execute the virtual battle because the physical strength of the enemy character becomes "0" or the like, the icon corresponding to the enemy character, displayed in the sequence of action display portion 43, may not be displayed. On the other hand, when it becomes impossible to execute the virtual battle because the physical strength of the ally character becomes "0" or the like, it may be impossible to select only the action of the ally character, while the icon displayed in the sequence of action display portion 43 remains displayed. Further, the next sequence of action of the ally character may be calculated based on the basic action value of the ally character, or irrespective of the basic action value of the ally character, a uniform sequence of action may be calculated for the characters who cannot execute virtual battle.

The sequence of action display portion 43 may be displayed at any position on the execution screen 40, and may be at the upper part, the lower part, the left side, or the right side of the execution screen 40.

A character whose action can be selected in the earliest order is extracted based on the sequence of action calculated in step S21 (step S23). Next, the number of times that the action of the character can be selected (hereinafter referred to as the number of action selectable) is referred to (step S24). Then, it is determined whether or not it is possible to select the action of the character (step S25).

FIG. 9 is a diagram showing a number of action selectable master table corresponding to at least one of the embodiments of the present invention. In the number of action selectable master table 60, the number of action selectable 62 is stored in association with the character 61. In step S24, the number of action selectable master table 60 is referred to, and the number of action selectable corresponding to the character extracted in step S23 is specified. When the specified number of action selectable is larger than the predetermined value, it is determined that the action of the character can be selected (Yes in step S25). Then, a screen (hereinafter referred to as an action selection screen) showing options of actions that can be executed by the character is displayed (step S26). On the other hand, when the specified number of action selectable is less than or equal to the predetermined value, it is determined that the action of the character cannot be selected (No in step S25), and the number of action selectable corresponding to the character is increased (step S39). Then, as in the case where the action of the character is executed, a new sequence of action is calculated (step S21). The predetermined value serving as a reference for determining whether or not the action of the character can be selected may be any value, for example, "0", "5", "100", or the like.

The number of action selectable stored in the number of action selectable master table 60 may be increased when the action selection of the corresponding character becomes possible, may be changed according to the type of action of the corresponding character, determined during the virtual battle, may be changed according to a certain rule, and may be added to all the ally characters or all the enemy characters at the start of the virtual battle with a certain probability. Further, the number of action selectable may have a lower limit and/or an upper limit. For example, the lower limit may be −3 and the upper limit may be 3.

Figure 10A:
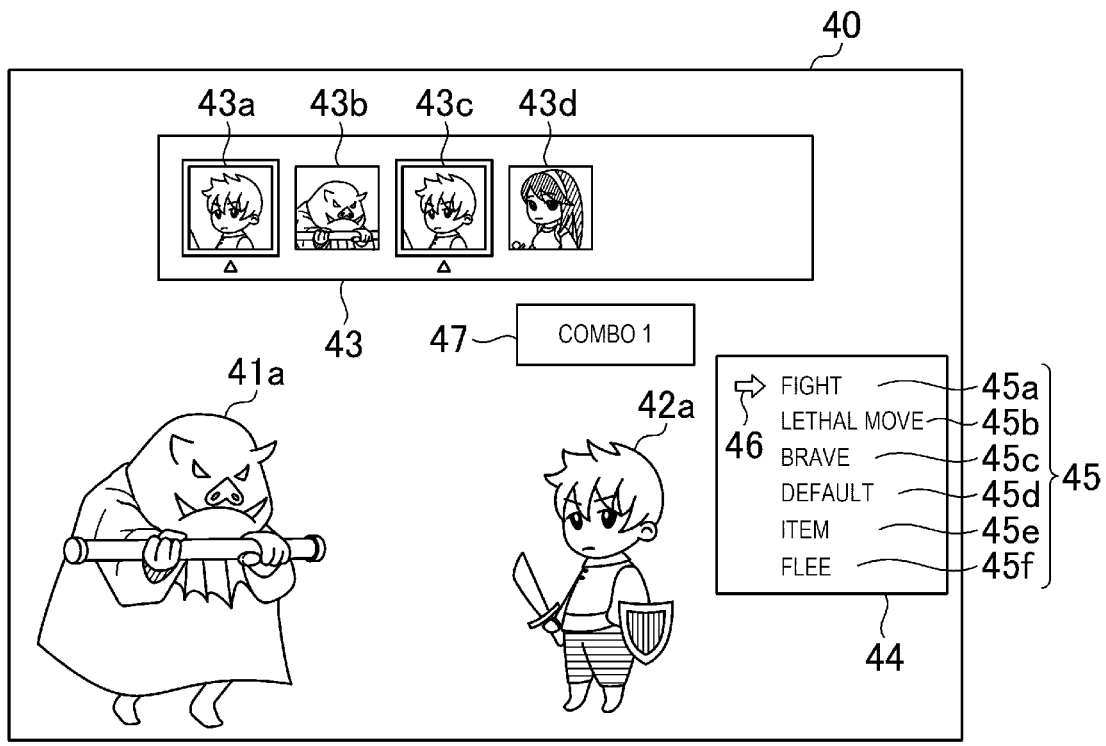
FIGS. 10A and 10B are examples of program execution screens corresponding to at least one of the embodiments of the present invention.
Figure 10B:
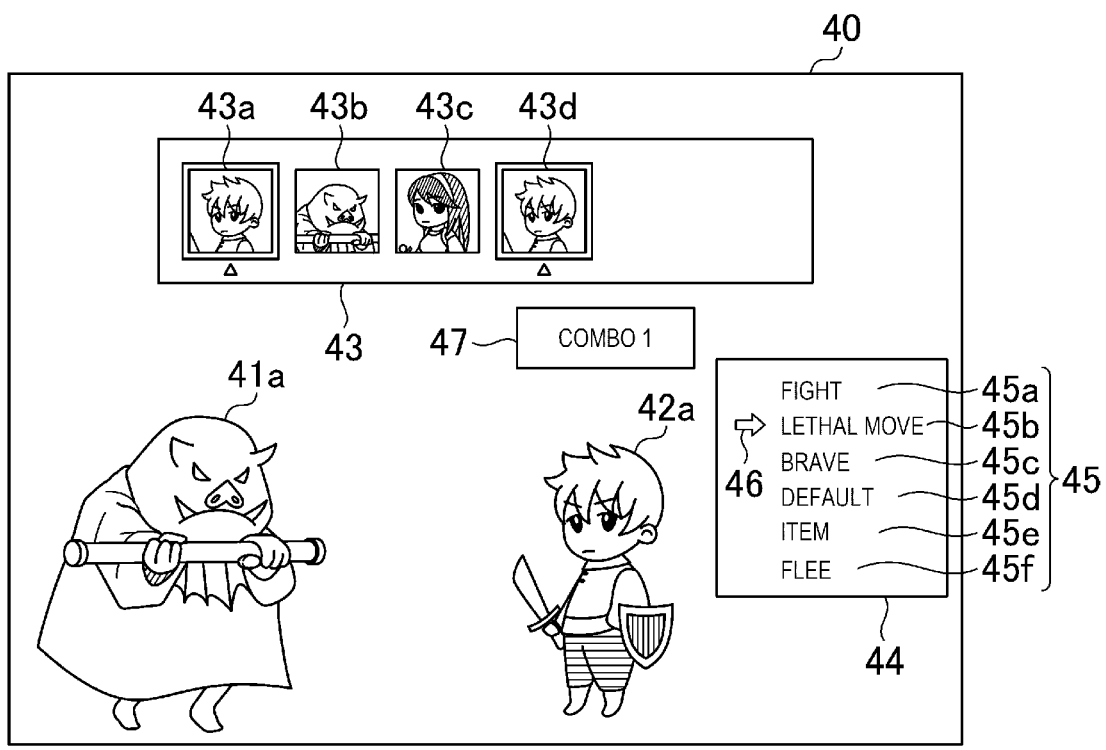

FIGS. 10A and 10B are examples of program execution screens corresponding to at least one of the embodiments of the present invention. When it is determined that the action of the character can be selected (Yes in step S25), the action selection screen 44 corresponding to the character is displayed on the execution screen 40 (step S26). An action option 45 that can be executed by the character and a cursor 46 indicating the action option are displayed on the action selection screen 44, and the action option 45 which is pointed to by the cursor 46 is in a provisionally selected state (step S27). Next, when the provisionally selected action option is actually determined, an order in which the character can act next is calculated (step S28). Further, when the provisionally selected action option is actually determined, the number of times the action satisfying the first predetermined condition is executed (hereinafter, referred to as the accumulated number of action) is accumulated (step S29). Then, the sequence of action of the characters participating in the virtual battle, including the order in which the character can act next, is displayed on the sequence of action display portion 43 (step S30). Further, the accumulated number of action is displayed on the accumulated number of action display unit 47 on the execution screen 40 (step S31). The so-called "combo number" such as "combo number 1" is displayed on the accumulated number of action display unit 47.

Examples of the first predetermined condition include continuous execution of the same type of action by the ally character, such as continuous execution of the action of the ally character, continuous execution of the action in which the ally character damages the enemy character, and continuous execution of the action that the ally character recovers the ally character.

FIG. 11 is a diagram showing an action order influence value master table corresponding to at least one of the embodiments of the present invention. In the action order influence value master table 70, the action order influence value 72 is stored in association with the action type 71. In step S28, the action order influence value master table 70 is referred to, and the action order influence value corresponding to the type of action provisionally selected in step S27 is specified. When the provisionally selected action option is actually determined, an order in which the character can act next is calculated, based on the basic action value corresponding to the character and the action order influence value corresponding to the provisionally selected action type, which are stored in the basic action value master table 50. For example, the action value is a value obtained by adding the basic action value corresponding to the character and the action order influence value corresponding to the determined action type, the action value of the character participating in the virtual battle is reduced equally, and the action may be selected in order from the character having the action value "0". In that case, when the virtual battle is started, the action of the ally character 42a having the smallest basic action value among the characters participating in the virtual battle can be selected earliest. When the order of the action of the ally character 42a comes around, "10" is equally subtracted from the action values of all the characters participating in the battle, so that the action value of the ally character 42a is "0", the action value of the enemy character 41a is "10", and the action value of the ally character 42b is "13". Here, as shown in FIG. 10A, when the ally character 42a provisionally selects the action of the option 45a "fight", the action order influence value "2" corresponding to the action "fight" is added to the basic action value "10" corresponding to the ally character 42a, so that the action value of the ally character 42a after the action of the option 45a "fight" is determined becomes "12". When the action value of the ally character 42a is "12", it is between the action value of the enemy character 41a and the action value of the ally character 42b, so that the sequence of action of the ally character 42a after the action of the option 45a "fight" is determined is calculated to be between the enemy character 41a and the ally character 42b. Then, the icon 43c corresponding to the ally character 42a is displayed between the icon 43b corresponding to the enemy character 41a and the icon 43d corresponding to the ally character 42b in the sequence of action display portion 43. On the other hand, as shown in FIG. 10B, when the ally character 42a provisionally selects the action of the option 45b "lethal move", the action order influence value "5" corresponding to the action "lethal move" is added to the basic action value "10" corresponding to the ally character 42a, so that the action value of the ally character 42a after the action of the option 45b "lethal move" is determined becomes "15". When the action value of the ally character 42a is "15", it is larger than the action value of the ally character 42b, so that the sequence of action of the ally character 42a after the action of the option 45b "lethal move" is determined is calculated to be after the ally character 42b, and the icon 43d corresponding to the ally character 42a is displayed behind the icon 43c corresponding to the ally character 42b in the sequence of action display portion 43. In addition, the icon corresponding to the character that is selecting an action and the icon indicating the next action order of the character may be modified by being displayed in a large size, changing the color around the icons, or by pointing the icons with an arrow, for easy recognition.

FIG. 12 is a diagram showing an accumulated number of action data table corresponding to at least one of the embodiments of the present invention. The accumulated number of action data table 80 stores a character 81 who has executed the action satisfying the first predetermined condition, the type 82 of the action satisfying the first predetermined condition, and the accumulated number 83 of the action satisfying the first predetermined condition. For example, the first predetermined condition is that the action of the ally character may be continuously executed without the action of the enemy character being executed, or that the action of the ally character damaging the enemy character may be continuously executed. The ally character may be a character operated by the player or a character other than the character operated by the player. The character other than the character operated by the player is, for example, a character acting according to the operation of another player, a character whose action is controlled by a program, or the like. The number of actions satisfying a predetermined condition (hereinafter referred to as the accumulated number of action) may be reset to "0" when an action that does not satisfy the predetermined condition is executed, and the number of actions satisfying the predetermined condition may be accumulated, without accumulating only the number of actions that do not satisfy the predetermined condition.

In step S29, with reference to the accumulated number of action data table 80, the accumulated number of action when the action provisionally selected by the character is determined is accumulated. In addition, the accumulated number of action display unit 47 may be displayed at any position on the execution screen 40, and may be at the upper part, the lower part, or the left side or the right side.

When the provisionally selected action option is actually determined, after the player checks an order in which the character can act next and how many times the action satisfying the predetermined condition is executed, it is possible to determine whether to determine the provisionally selected action (step S32). When the player determines the provisionally selected action (Yes in step S32), the determination of the action is received (step S33). When the player does not determine the provisionally selected action (No in step S32), another option can be provisionally selected by moving the cursor 46 (step S27).

When the determination of the action is received in step S33, it is determined whether or not the action corresponds to the third action (step S34). The third action is an action that enables the character to continuously execute an action, and is referred to as "brave" here. When the action is "brave" (Yes in step S34), another action selection screen 44 of the character to execute the action is additionally displayed (step S26). When the action is not "brave" (No in step S34), then it is determined whether the action corresponds to the first action (step S35). The first action is an action that increases the number of action selectable of the character, and is referred to as "default" here. When the character is caused to execute the "default", the character may execute the action of "defense" and the number of action selectable of the character may be increased. When the action is the "default" (Yes in step S35), the number of action selectable corresponding to the character, which is stored in the number of action selectable master table 60 increases (step S36). When the action is not "default" (No in step S35), the action is determined to correspond to the second action, and the number of action selectable corresponding to the character, which is stored in the number of action selectable master table 60 decreases (step S37). The second action is an action other than the "default", and may be an action such as "fight", "lethal move", "magic", and "item". After the number of action selectable has decreased in step S37, it is determined whether or not the action selection screen 44 additionally displayed by determining "brave" remains (step S38). When the action selection screen 44 remains (Yes in step S38), the action is provisionally selected on the action selection screen 44 (step S27). When the action selection screen 44 does not remain (No in step S38), the next step S40 is executed.

When the character can determine "brave" a plurality of times, it is possible to display a plurality of action selection screens 44. The number of times the "brave" can be determined may be set to any number, and may be four times or ten times, for example. Further, when "brave" is determined and the action selection screen 44 is additionally displayed, it may be impossible to determine "default". Further, in a case where the character has executed a plurality of actions by determining "brave", when the next action order of the character is calculated in step S28, a calculation method different from the normal may be adopted. For example, the action order may be earlier or later than when the action is executed a plurality of times without determining "brave".

After the number of action selectable corresponding to the character has increased or decreased in step S36 or step S37, when the action for receiving the decision satisfies the first predetermined condition, information on the action is stored in the accumulated number of action data table 80.

FIG. 13 is a diagram showing an effect addition master table corresponding to at least one of the embodiments of the present invention. The effect addition master table 90 stores the effect 92 to be added in association with the accumulated number of action 91. In step S40, an effect corresponding to the accumulated number of actions at the time of step S40 is added with reference to the effect addition master table 90. The effect to be added is an effect added to the action or state of the character, for example, an effect added in addition to the effect usually generated by the action of the character. Specifically, the effect may be advantageous or disadvantageous for the player to win the virtual battle, and more specifically, may be an effect that the damage done when the enemy character is attacked is larger than the normal attack, the recovery amount of the recovery magic executed on the ally character is larger than the recovery amount of the normal recovery magic, and the hit rate of the attack executed by the ally character is higher than the hit rate of the normal attack. Further, the effect to be added may be increased as the accumulated number of action increases, may be constant regardless of the accumulated number of action, or may be increased as the accumulated number of action increases but may be constant when the accumulated number of action is greater than or equal to a certain number.

After the effect is added in step S40, the action, for which the determination is received in step S33, is executed (step S41). When the action is executed, a performance for executing the action is displayed (step S42).

The performance for executing the action is displayed in step S42, and when the virtual battle end condition is satisfied, the virtual battle ends, but when the virtual battle end condition is not satisfied, steps S21 to S42 are repeated until the virtual battle end condition is satisfied.

When the virtual battle end condition is satisfied and the condition for the player to win the virtual battle is also satisfied, a reward that is advantageous for the player to advance the game may be given. The reward that is advantageous for the player to advance the game is, for example, an experience value required for leveling up, points required for strengthening attributes, an item, or the like.

When the virtual battle is started because the third predetermined condition is satisfied, after the condition for ending the virtual battle is satisfied, the game does not shift to the screen other than the virtual battle, and the next virtual battle may be continuously started. Further, at that time, even if the conditions for the player to win the virtual battle is satisfied, the reward may be given after all the consecutive virtual battles are completed. The third predetermined condition may be, for example, that an ally character comes into contact with a plurality of enemy characters at the same time on a screen other than virtual battle, that it is programmed to satisfy the third predetermined condition with a certain probability at the start of virtual battle, or that it is required in a game story.

Further, when the virtual battle is started because the second predetermined condition is satisfied, the sequence of action may be calculated such that all the ally characters execute actions earlier than all the enemy characters when the sequence of action is calculated in step S21. The second predetermined condition may be, for example, that an ally character comes into contact with an enemy character from behind the enemy character on a screen other than virtual battle, that it is programmed to satisfy the second predetermined condition with a certain probability at the start of virtual battle, or that it is required in a game story.

In the fourth embodiment, the applicable field of the game is a game that proceeds by determining the actions of a plurality of characters from a plurality of options, such as role playing games, fighting games, card games, music games, city building games, and strategy simulation games, and is not limited by the above description.

As an aspect of the fourth embodiment, by calculating a sequence of actions of a plurality of characters when the actions of the characters are determined from a plurality of options, accumulating the number of times of the actions satisfying a first predetermined condition when the action of the character is determined from the plurality of options, displaying the calculated sequence of actions of the plurality of characters, displaying the accumulated number of actions satisfying the first predetermined condition, which is accumulated, receiving determination of the actions of the characters, and causing the character to execute the received action, according to the calculated sequence of actions, it is possible to provide a game program having sufficient strategy and taste.

As an aspect of the fourth embodiment, when one action of the character is determined from the plurality of options, a sequence of actions including a next action of the one action of the character is calculated, and the order of action of the next action differs according to the one action, so that it is possible to provide a game having an increased strategy in the action selection and higher taste.

As one aspect of the fourth embodiment, a predetermined effect is added according to the accumulated number of action satisfying the first predetermined condition, so that it is motivated to select actions in consideration of the next sequence of actions, and the taste of the game can be improved.

As one aspect of the fourth embodiment, the sequence of action of the character is calculated according to the element unique to the character, so that it is possible to provide a game with higher taste in which the prediction regarding the sequence of action is not monotonous.

As one aspect of the fourth embodiment, the sequence of action of the character is calculated according to the status, attributes, equipment, and/or belongings of the character, so that it is possible to provide a game with taste which is motivated to adjust the status, attributes, equipment, and/or belongings of the character to be advantageous in terms of the sequence of action, and develops characters strategically.

As one aspect of the fourth embodiment, the number of actions which are executed by the character other than the character operated by the player and satisfy the first predetermined condition is also accumulated together, so that it is possible to provide a game with higher taste from which an effect that cannot be achieved by one player alone can be expected.

As one aspect of the fourth embodiment, a screen showing the action options that can be executed by the character is displayed, when the character executes the first action, the number of actions selectable, which is the number of times that an action can be selected, is increased, when the character executes the second action, the number of actions selectable is decreased, when the character determines the third action, a screen showing the options of actions that can be executed by the character is displayed such that the character can execute actions continuously, so that it is possible to provide a game with higher taste in which various strategies can be adopted regarding the method of selecting an action.

As one aspect of the fourth embodiment, when a character determines a third action, a plurality of screens showing the options of actions that can be executed by the character are displayed such that the character can execute actions continuously, so that it is possible to provide a game having a wider range of strategies regarding the method of selecting an action and higher taste.

As one aspect of the fourth embodiment, a screen showing the options of actions that can be executed by the character is displayed according to the calculated sequence of action, when the number of action selectable corresponding to the character is a predetermined value or less, instead of displaying a screen showing the options of actions that can be executed by the character, a screen showing the options of actions that can be executed by the character next to the character in the calculated sequence of action is displayed, so that it is possible to provide a game with taste in which a disadvantageous situation is assumed depending on the method of selecting an action, and more strategic action selection is required.

As one aspect of the fourth embodiment, the game is a game in which an enemy character and an ally character execute virtual battle, and in the virtual battle, within a predetermined period or a predetermined number of actions, the enemy character and the ally character do not execute actions of a number determined for each character, and the sequence of action of the plurality of characters is calculated such that the number of actions for each character is different, so that it is possible to provide a game with higher taste in which the selected action greatly affects the next sequence of action and more strategy is required.

As one aspect of the fourth embodiment, the game is a game in which an enemy character and an ally character execute virtual battle, and when a second predetermined condition is satisfied, the sequence of action is calculated such that all ally characters, among the plurality of characters, execute the actions earlier than all the enemy characters, so that it is possible to provide a game with higher taste in which virtual battle can be executed under advantageous conditions.

As one aspect of the fourth embodiment, the game is a game in which an enemy character and an ally character execute virtual battle, and the virtual battle is continuously executed when a third predetermined condition is satisfied, so that it is possible to provide a game which becomes more surprising and has higher taste.

As one aspect of the fourth embodiment, the information about the character corresponding to each action is displayed, and the information about the state of the character is displayed together with the information about the character, so that it is possible to provide a game with higher taste in which it becomes easier to recognize the state of the character.

In the fourth embodiment, as "character", "action", "computer apparatus", "game", "sequence of action", and "first predetermined condition", the contents described in the first embodiment can be adopted within a necessary range.

In the fourth embodiment, as the "action order", the contents described in the second embodiment can be adopted within necessary ranges.

In the fourth embodiment, as the "predetermined effect", the contents described in the third embodiment can be adopted within a necessary range.

In the fourth embodiment, the "element unique to the character" means a characteristic element unique to the character, and for example, may be the status, attributes, equipment, and/or belongings of the character, more specifically, "quickness", "equipment weight", "weight", "occupation", "belonging", or the like of the character.

In the fourth embodiment, the "character other than the character operated by the player" means, for example, a character that executes an action according to the operation of another player, a character whose action is controlled by a program, or the like, and includes a character who is a friend of the character operated by the player, a character who is an enemy of the character operated by the player, a character who takes a neutral position without being a friend or enemy of the character operated by the player, or the like.

In the fourth embodiment, the "first action" means an action that affects the number of action selectable, and may be, for example, an action that increases the number of action selectable of the character, which is referred to as "default". The "second action" means an action that affects the number of action selectable, and may be, for example, an action that decreases the number of action selectable of the character, more specifically, actions other than "default", such as "fight", "lethal move", "magic", and "item". The "third action" means, for example, an action involved in the character executing actions continuously, and is referred to as "brave" here.

In the fourth embodiment, the "predetermined value" may be any value, for example, "0", "5", "100" or the like.

In the fourth embodiment, the "virtual battle" is, for example, a battle executed in a virtual space provided by a program, in which an ally and an enemy are distinguished from each other and fight, and which proceeds when the enemy character and the ally character execute actions in order. It also includes a battle that is automatically controlled by the program without any operation instruction from the player.

In the fourth embodiment, the "predetermined period" means, for example, any period during virtual battle, and more specifically, one turn during which all enemy characters and all ally characters take action once, a certain amount of time that elapses during virtual battle, or the like.

In the fourth embodiment, the "predetermined number of actions" is, for example, the number of times a character acts during virtual battle, and means any number, more specifically, may be a number equal to the total numbers of all enemy characters and all ally characters, or may be 10 times or 20 times.

In the fourth embodiment, the "second predetermined condition" means, for example, a condition different from the normal condition, which may occur at the start of virtual battle, and more specifically, a condition that on a screen other than virtual battle, an ally character comes into contact with an enemy character from behind the enemy character to start virtual battle, that it is programmed to satisfy the second predetermined condition with a certain probability at the start of virtual battle, or that it is required in a game story.

In the fourth embodiment, the "third predetermined condition" means, for example, a condition different from the normal condition that may occur at the start of virtual battle, and more specifically, a condition that on a screen other than virtual battle, an ally character comes into contact with a plurality of enemy characters at the same time, that it is programmed to satisfy the third predetermined condition with a certain probability at the start of virtual battle, or that it is required in a game story.

In the fourth embodiment, "the information about the state of the character" means, for example, information related to the state of the character, and more specifically, information about a state where it is impossible to execute virtual battle, a state where it is not possible to select an action, a state of being poisoned, a state of being paralyzed, a state of being petrified, a state where attack power is increasing, or a state where defense power is increasing.

Fifth Embodiment

Figure 14:
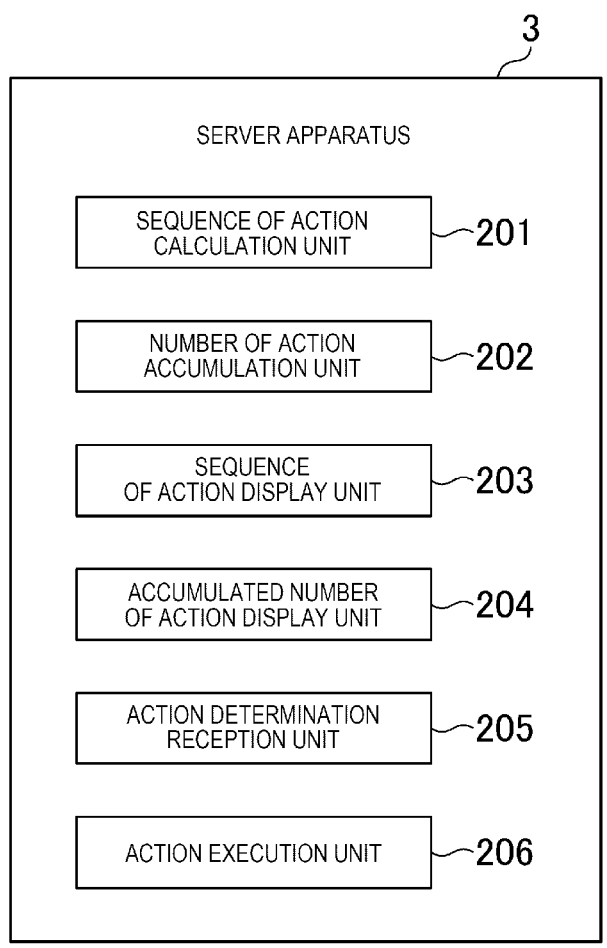
FIG. 14 is a block diagram showing a configuration of a server apparatus corresponding to at least one of the embodiments of the present invention.

Next, an outline of the fifth embodiment of the present invention will be described. FIG. 14 is a block diagram showing a configuration of a server apparatus corresponding to at least one of the embodiments of the present invention. A server apparatus 3 includes at least a sequence of action calculation unit 201, a number of action accumulation unit 202, a sequence of action display unit 203, an accumulated number of action display unit 204, an action determination reception unit 205, and an action execution unit 206.

The sequence of action calculation unit 201 has a function of calculating the sequence of actions of a plurality of characters when the actions of the characters are determined from a plurality of options. The number of action accumulation unit 202 has a function of accumulating the number of actions satisfying a first predetermined condition when the actions of the characters are determined from the plurality of options. The sequence of action display unit 203 has a function of displaying the sequence of actions of the plurality of characters calculated by the sequence of action calculation unit 201. The accumulated number of action display unit 204 has a function of displaying the accumulated number of actions that satisfy the first predetermined condition accumulated by the number of action accumulation unit 202. The action determination reception unit 205 has a function of receiving determination of the actions of the characters. The action execution unit 206 has a function of causing the character to execute the action received by the action determination reception unit 205 according to the sequence of action calculated by the sequence of action calculation unit 201.

Figure 15:
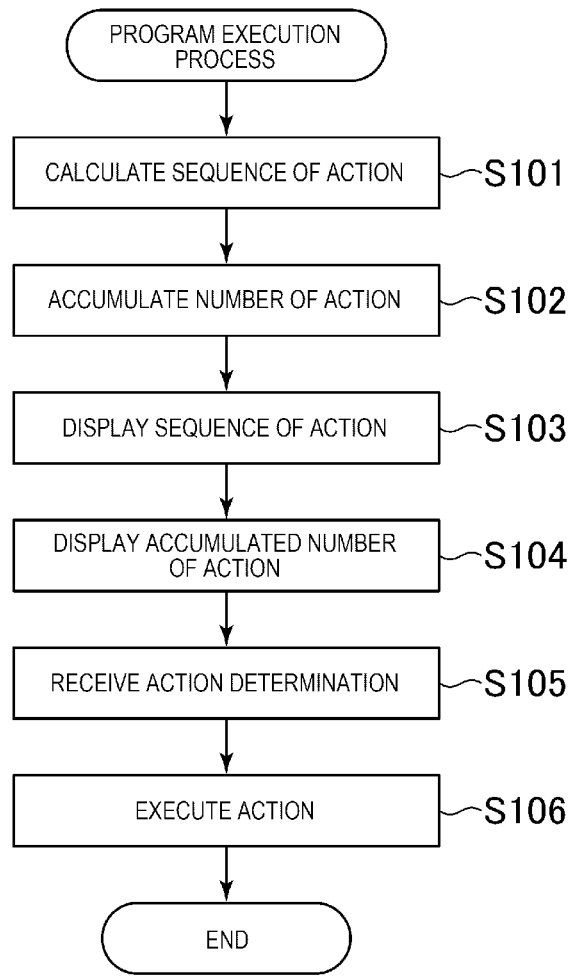
FIG. 15 is a flowchart of a program execution process corresponding to at least one of the embodiments of the present invention.

A program execution process according to the fifth embodiment of the present invention will be described. FIG. 15 is a flowchart of a program execution process corresponding to at least one of the embodiments of the present invention.

First, the server apparatus 3 calculates the sequence of actions of the plurality of characters when the action of the character is determined from the plurality of options (step S101). Then, the server apparatus 3 accumulates the number of times of the actions satisfying a first predetermined condition when the action of the character is determined from the plurality of options (step S102). Next, the server apparatus 3 displays the sequence of actions of the plurality of characters calculated in step S101 (step S103). Then, the server apparatus 3 displays the accumulated number of actions satisfying the first predetermined condition, which is accumulated in step S102 (step S104). The server apparatus 3 receives the determination of the action of the character (step S105). Then, the server apparatus 3 causes the character to execute the action received in step S105, according to the sequence of action calculated in step S101 (step S106), and terminates the process.

As an aspect of the fifth embodiment, by calculating a sequence of actions of a plurality of characters when the actions of the characters are determined from a plurality of options, accumulating the number of times of the actions satisfying a first predetermined condition when the action of the character is determined from the plurality of options, displaying the calculated sequence of actions of the plurality of characters, displaying the accumulated number of actions satisfying the first predetermined condition, which is accumulated, receiving determination of the actions of the characters, and causing the character to execute the received action, according to the calculated sequence of actions, it is possible to provide a game program having sufficient strategy and taste.

In the fifth embodiment, as "character", "action", "sequence of action", and "first predetermined condition", the contents described in the first embodiment can be adopted within a necessary range.

In the fifth embodiment, the "terminal apparatus" means, for example, a desktop or notebook personal computer, a tablet computer, a PDA, a mobile phone, a smartphone, a portable game console, or the like, and means an apparatus which is operated by the player and is communicatively connectable to the server apparatus.

In the fifth embodiment, the "server apparatus" means, for example, an apparatus that executes a process in response to a request from a terminal apparatus.

In the fifth embodiment, the "game" means, for example, a computer game in which the game runs in the server apparatus and the game proceeding state is displayed in the terminal apparatus, and the genre of the game content does not matter.

Sixth Embodiment

Figure 16:
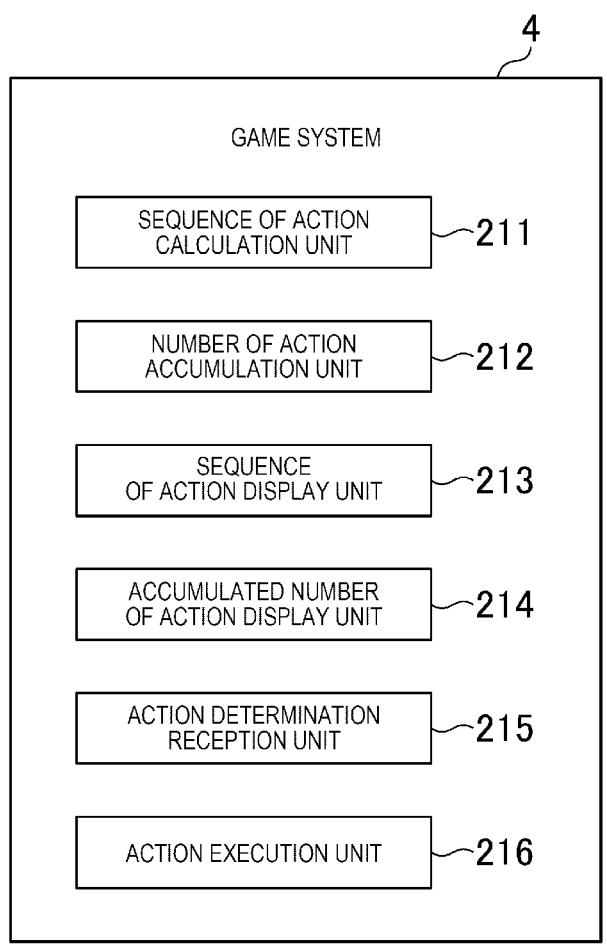
FIG. 16 is a block diagram showing a configuration of a game system corresponding to at least one of the embodiments of the present invention.
Figure 17:
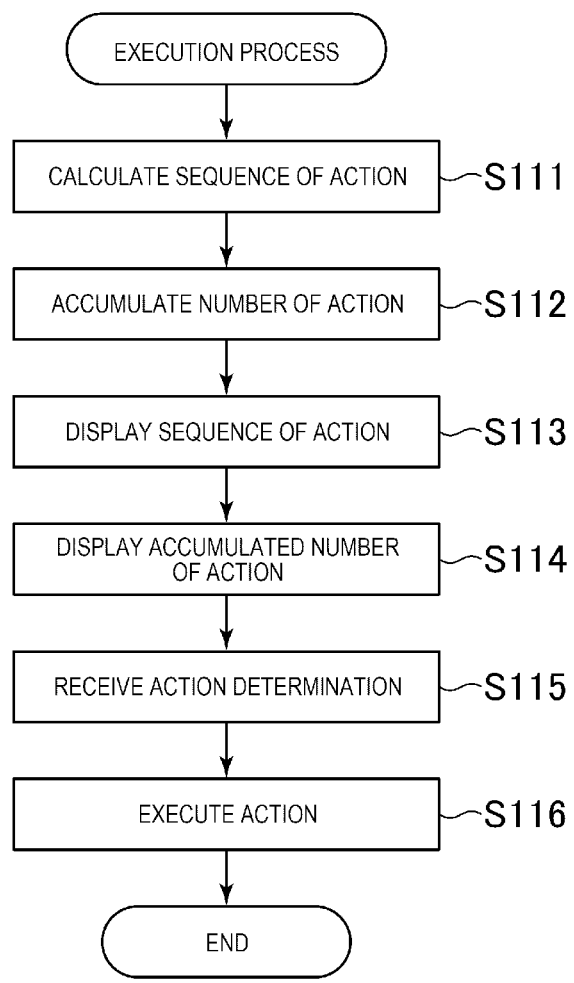
FIG. 17 is a flowchart of a program execution process corresponding to at least one of the embodiments of the present invention.

Next, an outline of the sixth embodiment of the present invention will be described. FIG. 16 is a block diagram showing a configuration of a game system corresponding to at least one of the embodiments of the present invention. The game system 4 includes at least a sequence of action calculation unit 211, a number of action accumulation unit 212, a sequence of action display unit 213, an accumulated number of action display unit 214, an action determination reception unit 215, and an action execution unit 216.

The sequence of action calculation unit 211 has a function of calculating the sequence of actions of a plurality of characters when the actions of the characters are determined from a plurality of options. The number of action accumulation unit 212 has a function of accumulating the number of actions satisfying a first predetermined condition when the actions of the characters are determined from the plurality of options. The sequence of action display unit 213 has a function of displaying the sequence of actions of the plurality of characters calculated by the sequence of action calculation unit 211. The accumulated number of action display unit 214 has a function of displaying the accumulated number of actions that satisfy the first predetermined condition accumulated by the number of action accumulation unit 212. The action determination reception unit 215 has a function of receiving determination of the actions of the characters. The action execution unit 216 has a function of causing the character to execute the action received by the action determination reception unit 215 according to the sequence of action calculated by the sequence of action calculation unit 211.

A program execution process according to the sixth embodiment of the present invention will be described. FIG.

17 is a flowchart of a program execution process corresponding to at least one of the embodiments of the present invention.

First, the game system 4 calculates the sequence of actions of the plurality of characters when the action of the character is determined from the plurality of options (step S111). Then, the game system 4 accumulates the number of times of the actions satisfying a first predetermined condition when the action of the character is determined from the plurality of options (step S112). Next, the game system 4 displays the sequence of actions of the plurality of characters calculated in step S111 (step S113). Then, the game system 4 displays the accumulated number of actions satisfying the first predetermined condition, which is accumulated in step S112 (step S114). The game system 4 receives the determination of the action of the character (step S115). Then, the game system 4 causes the character to execute the action received in step S115 according to the sequence of action calculated in step S111 (step S116), and terminates the process.

As one aspect of the sixth embodiment, by calculating a sequence of actions of a plurality of characters when the actions of the characters are determined from a plurality of options, accumulating the number of times of the actions satisfying a first predetermined condition when the action of the character is determined from the plurality of options, displaying the calculated sequence of actions of the plurality of characters, displaying the accumulated number of actions satisfying the first predetermined condition, which is accumulated, receiving determination of the actions of the characters, and causing the character to execute the received action, according to the calculated sequence of actions, it is possible to provide a game program having sufficient strategy and taste.

In the sixth embodiment, as "character", "action", "sequence of action", and "first predetermined condition", the contents described in the first embodiment can be adopted within a necessary range.

In the sixth embodiment, as the "terminal apparatus", the "server apparatus", and the "game", the contents described in the fifth embodiment can be adopted within necessary ranges.

Seventh Embodiment

Figure 18:
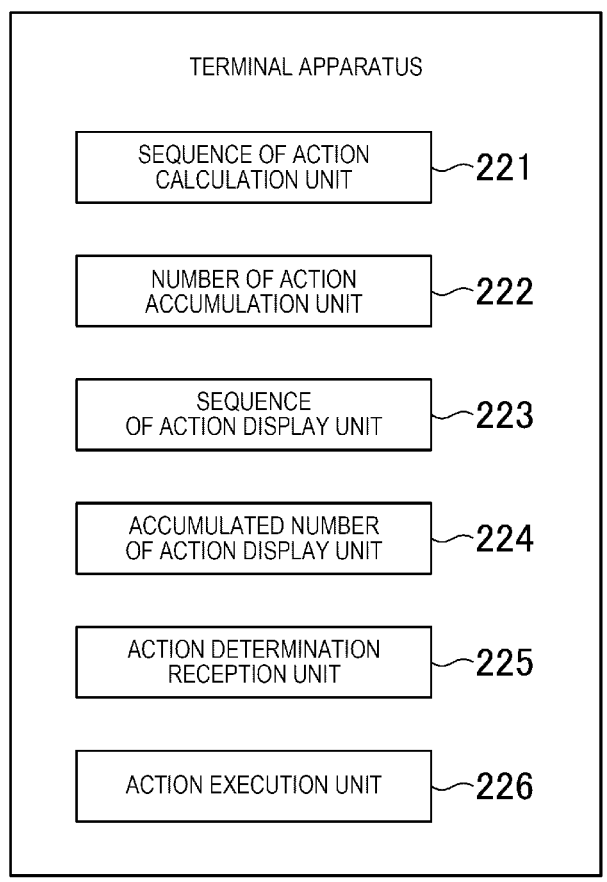
FIG. 18 is a block diagram showing a configuration of a terminal apparatus corresponding to at least one of the embodiments of the present invention.

Next, an outline of the seventh embodiment of the present invention will be described. FIG. 18 is a block diagram showing a configuration of a terminal apparatus corresponding to at least one of the embodiments of the present invention. The terminal apparatus 5 includes at least a sequence of action calculation unit 221, a number of action accumulation unit 222, a sequence of action display unit 223, an accumulated number of action display unit 224, an action determination reception unit 225, and an action execution unit 226.

The sequence of action calculation unit 221 has a function of calculating the sequence of actions of a plurality of characters when the actions of the characters are determined from a plurality of options. The number of action accumulation unit 222 has a function of accumulating the number of actions satisfying a first predetermined condition when the actions of the characters are determined from the plurality of options. The sequence of action display unit 223 has a function of displaying the sequence of actions of the plurality of characters calculated by the sequence of action calculation unit 221. The accumulated number of action display unit 224 has a function of displaying the accumulated number of actions that satisfy the first predetermined condition accumulated by the number of action accumulation unit 222. The action determination reception unit 225 has a function of receiving determination of the actions of the characters. The action execution unit 226 has a function of causing the character to execute the action received by the action determination reception unit 225 according to the sequence of action calculated by the sequence of action calculation unit 221.

Figure 19:
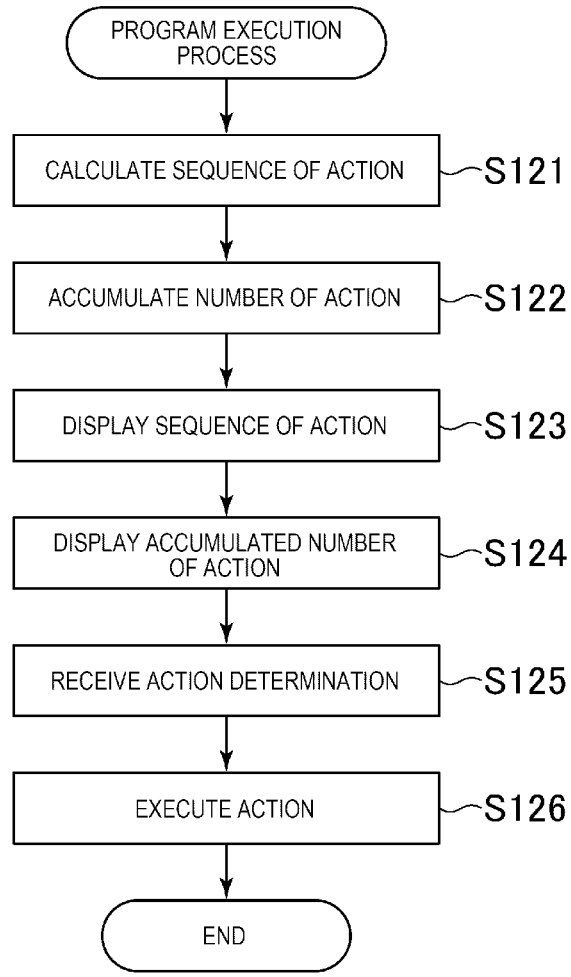
FIG. 19 is a flowchart of a program execution process corresponding to at least one of the embodiments of the present invention.

A program execution process according to the seventh embodiment of the present invention will be described. FIG. 19 is a flowchart of a program execution process corresponding to at least one of the embodiments of the present invention.

First, the terminal apparatus 5 calculates the sequence of actions of the plurality of characters when the action of the character is determined from the plurality of options (step S121). Then, the terminal apparatus 5 accumulates the number of times of the actions satisfying a first predetermined condition when the action of the character is determined from the plurality of options (step S122). Next, the terminal apparatus 5 displays the sequence of actions of the plurality of characters calculated in step S121 (step S123). Then, the terminal apparatus 5 displays the accumulated number of actions satisfying the first predetermined condition, which is accumulated in step S122 (step S124). The terminal apparatus 5 receives the determination of the action of the character (step S125). Then, the terminal apparatus 5 causes the character to execute the action received in step S125 according to the sequence of action calculated in step S121 (step S126), and terminates the process.

As an aspect of the seventh embodiment, by calculating a sequence of actions of a plurality of characters when the actions of the characters are determined from a plurality of options, accumulating the number of times of the actions satisfying a first predetermined condition when the action of the character is determined from the plurality of options, displaying the calculated sequence of actions of the plurality of characters, displaying the accumulated number of actions satisfying the first predetermined condition, which is accumulated, receiving determination of the actions of the characters, and causing the character to execute the received action, according to the calculated sequence of actions, it is possible to provide a game program having sufficient strategy and taste.

In the seventh embodiment, as "character", "action", "sequence of action", and "first predetermined condition", the contents described in the first embodiment can be adopted within a necessary range.

In the seventh embodiment, as the "terminal apparatus", the "server apparatus", and the "game", the contents described in the fifth embodiment can be adopted within necessary ranges.

Eighth Embodiment

Figure 20:
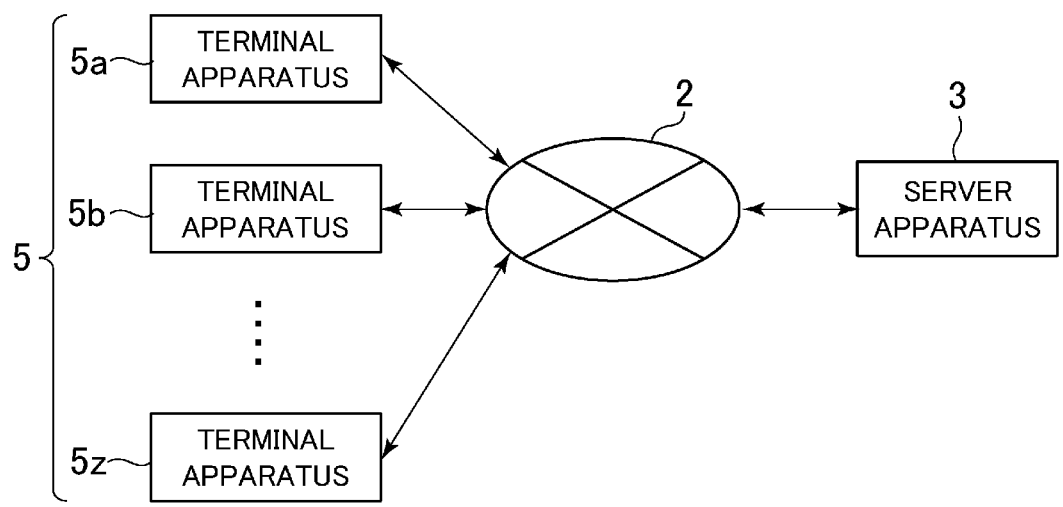
FIG. 20 is a block diagram showing a configuration of a game system corresponding to at least one of the embodiments of the present invention.

Next, an outline of the eighth embodiment of the present invention will be described. FIG. 20 is a block diagram showing a configuration of a game system corresponding to at least one of the embodiments of the present invention.

As illustrated, the game system is configured with a plurality of terminal apparatuses 5 (game apparatuses 5a, 5b, . . . , 5z) operated by a plurality of users (users A, B, . . . , Z), a server apparatus 3, and a communication network 2. The terminal apparatus 5 is connected to the server apparatus 3 via the communication network 2. The terminal apparatus 5 may not be constantly connected to the server apparatus 3, and may be connected as needed.

As the configuration of the terminal apparatus in the eighth embodiment, the configuration shown in the block diagram of the computer apparatus of FIG. 5 can be adopted within a necessary range.

Figure 21:
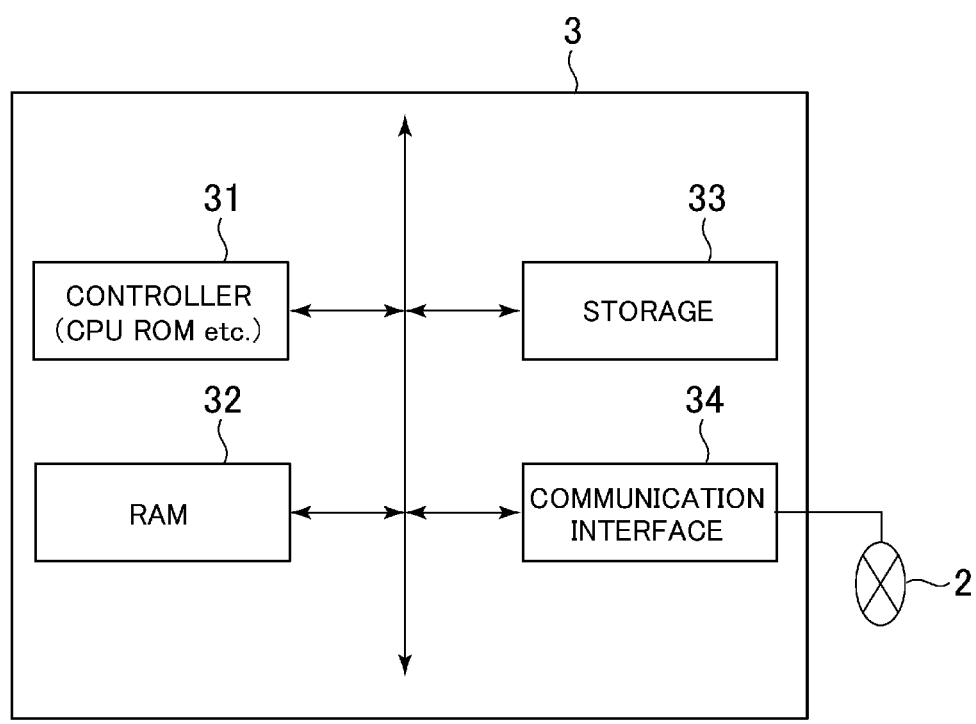
FIG. 21 is a block diagram showing a configuration of a server apparatus corresponding to at least one of the embodiments of the present invention.

FIG. 21 is a block diagram showing a configuration of a server apparatus corresponding to at least one of the embodiments of the present invention. The server apparatus 3 includes a controller 31, a RAM 32, a storage 33, and a communication interface 34, which are connected by an internal bus.

The controller 31 includes a CPU and a ROM, executes a program stored in the storage 33, and controls the server apparatus 3. Further, the controller 31 includes an internal timer that measures time. The RAM 32 is a work area of the controller 31.

The storage 33 is a storage area for storing programs (including game programs) and data (including game data). The controller 31 reads the program and the data from the RAM 32, and executes the program execution process, based on the request information received from the terminal apparatus 5.

Outline of Game

In the eighth embodiment of the present invention, a game in which a plurality of enemy characters and an ally character execute virtual battle is exemplified. As the outline of the game, the contents described in the fourth embodiment can be adopted within a necessary range.

Figure 22:
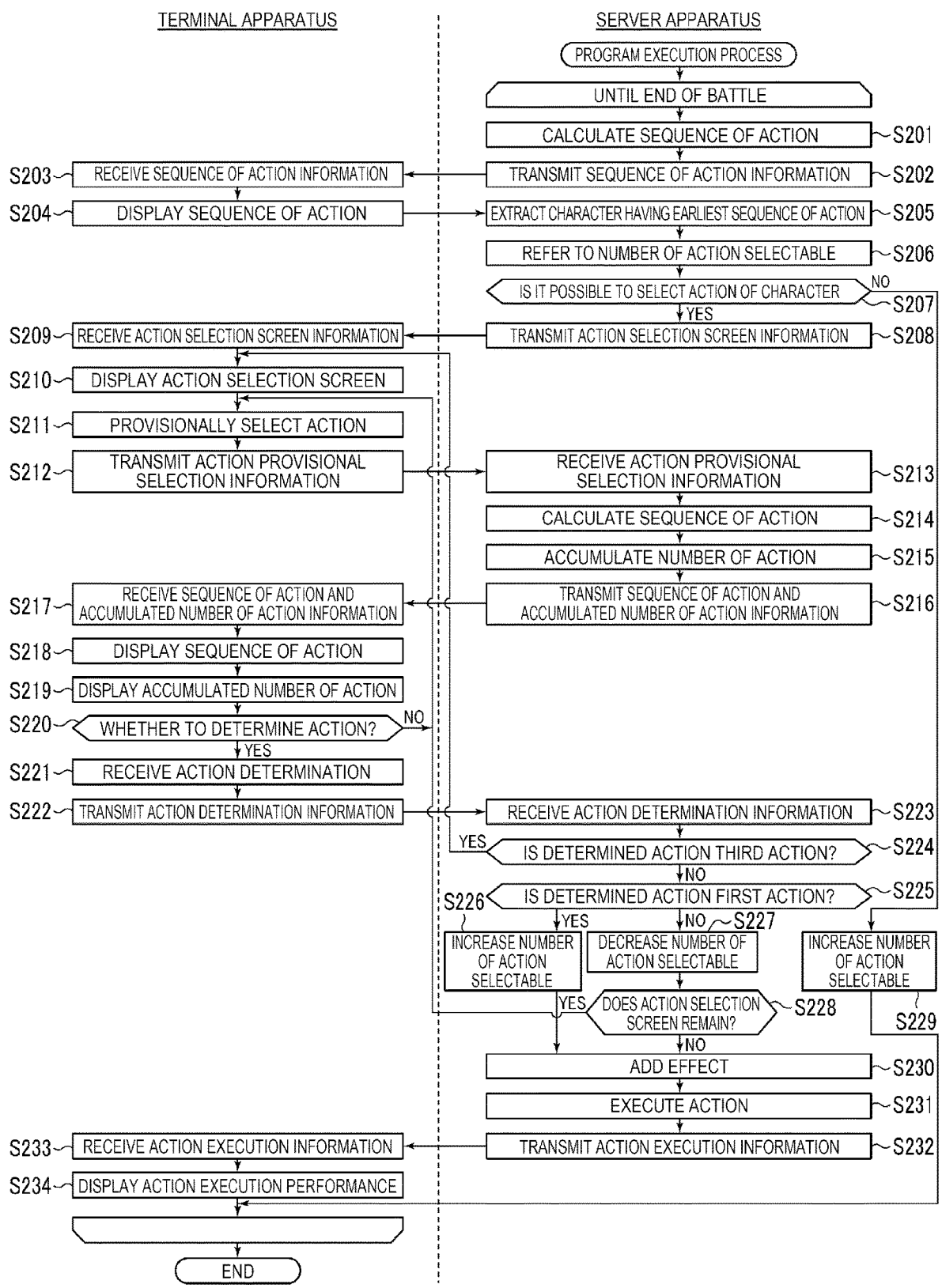
FIG. 22 is a flowchart of a program execution process corresponding to at least one of the embodiments of the present invention.

Next, a program execution process according to the eighth embodiment of the present invention will be described. FIG. 22 is a flowchart of a program execution process corresponding to at least one of the embodiments of the present invention. In addition, as the program execution screen in the eighth embodiment of the present invention, the example of the program execution screen of FIG. 7 can be adopted within a necessary range.

When the virtual battle is started, the execution screen 40 is displayed on the display screen 22 of the terminal apparatus 5. On the execution screen 40, an enemy character 41, an ally character 42, and a sequence of action display portion 43 are displayed. The server apparatus 3 calculates the sequence of action of the characters participating in the virtual battle (step S201). Next, the information regarding the sequence of action calculated in step S201 is transmitted to the terminal apparatus 5 (step S202). Then, the information regarding the sequence of action is received by the terminal apparatus 5 (step S203). Then, the sequence of action of the characters participating in the virtual battle is displayed on the sequence of action display portion 43 (step S204).

Regarding the calculation of the sequence of action in step S201 and the display of the sequence of action in step S204, the contents described in the fourth embodiment and FIG. 8 can be adopted within a necessary range.

In the server apparatus 3, a character whose action can be selected in the earliest order is extracted based on the sequence of action calculated in step S201 (step S205). Next, the number of action selectable of the character is referred to (step S206). Then, it is determined whether or not the action of the character can be selected (step S207).

Regarding the determination as to whether or not the action of the character can be selected in step S207, the contents described in the fourth embodiment and FIG. 9 can be adopted within a necessary range. When the number of action selectable of the character is larger than the predetermined value, it is determined that the action of the character can be selected (Yes in step S207). Then, the information on the action selection screen 44 corresponding to the character is transmitted to the terminal apparatus 5 (step S208). Next, the terminal apparatus 5 receives the information on the action selection screen 44 corresponding to the character (step S209). Then, the action selection screen 44 corresponding to the character is displayed on the execution screen 40 (step S210). On the other hand, when the number of action selectable corresponding to the character is less than or equal to the predetermined value, it is determined that the action of the character cannot be selected (No in step S207), and the number of action selectable corresponding to the character is increased (step S229). Then, as in the case where the action of the character is executed, a new sequence of action is calculated (step S201).

Regarding the temporal selection of the actions of the character, the calculation of the sequence of action, and the accumulation of the accumulated number of action in steps S211 to S215, the contents described in the fourth embodiment, FIG. 10A, FIG. 10B, FIG. 11, and FIG. 12 can be adopted within a necessary range.

An action option 45 that can be executed by the character and a cursor 46 indicating the action option are displayed on the action selection screen 44, and the action option 45 which is pointed to by the cursor 46 is in a provisionally selected state (step S211). Then, information on the provisionally selected action is transmitted to the server apparatus 3 (step S212). Then, the information on the action provisionally selected by the server apparatus 3 is received (step S213).

Next, when the provisionally selected action option is actually determined, an order in which the character can act next is calculated (step S214). In addition, the accumulated number of actions when the provisionally selected action option is actually determined is accumulated (step S215). Then, the information regarding the sequence of action of the characters participating in the virtual battle and the information regarding the accumulated number of actions, including the order in which the character can act next, are transmitted to the terminal apparatus 5 (step S216). Next, the terminal apparatus 5 receives the information regarding the sequence of action of the characters participating in the virtual battle and the information regarding the accumulated number of actions, including the order in which the character can act next (step S217). Then, the sequence of action of the characters participating in the virtual battle, including the order in which the character can act next, is displayed on the sequence of action display portion 43 (step S218). Further, the accumulated number of action is displayed on the accumulated number of action display unit 47 on the execution screen 40 (step S219). The so-called "combo number" such as "combo number 1" is displayed on the accumulated number of action display unit 47.

When the provisionally selected action option is actually determined, after the player checks the order in which the character can act next and how many times the action satisfying the predetermined condition is executed, it is possible to determine whether to determine the provisionally selected action (step S220). When the player determines the provisionally selected action (Yes in step S220), the determination of the action is received (step S221). When the player does not determine the provisionally selected action (No in step S220), another option can be provisionally selected by moving the cursor 46 (step S211).

The information regarding the action, for which the determination is received in step S221, is transmitted to the server apparatus 3 (step S222). Then, the server apparatus 3 receives the information regarding the action for which the determination is received (step S223).

Regarding the determination as to the determined action in step S224 and step S225, the contents described in the fourth embodiment can be adopted within a necessary range.

When the information regarding the action, for which the determination is received in step S223, is received, it is determined whether or not the action is "brave" (step S224). When the action is "brave" (Yes in step S224), another action selection screen 44 of the character to execute the action is additionally displayed (step S210). When the action is not "brave" (No in step S224), it is determined whether or not the action is "default" (step S225). When the action is the "default" (Yes in step S225), the number of action selectable corresponding to the character, which is stored in the number of action selectable master table 60 increases (step S226). When the action is not "default" (No in step S225), the action is determined to correspond to the second action, and the number of action selectable corresponding to the character, which is stored in the number of action selectable master table 60 decreases (step S227). After the number of action selectable has decreased in step S227, it is determined whether or not the action selection screen 44 additionally displayed by determining "brave" remains (step S228). When the action selection screen 44 remains (Yes in step S228), the action is provisionally selected on the action selection screen 44 (step S221). When the action selection screen 44 does not remain (No in step S228), the next step S230 is executed.

When the character can determine "brave" a plurality of times, it is possible to display a plurality of action selection screens 44. The number of times the "brave" can be determined may be set to any number, and may be four times or ten times, for example. Further, when "brave" is determined and the action selection screen 44 is additionally displayed, it may be impossible to determine "default". Further, in a case where the character has executed a plurality of actions by determining "brave", when the next action order of the character is calculated in step S214, a calculation method different from the normal may be adopted. For example, the action order may be earlier or later than when the action is executed a plurality of times without determining "brave".

After the number of action selectable corresponding to the character has increased or decreased in step S226 or step S227, when the action for which the determination is received satisfies the first predetermined condition, information on the action is stored in the accumulated number of action data table 80.

Regarding the effect addition in step S230, the contents described in the fourth embodiment and FIG. 13 can be adopted within a necessary range.

In step S230, an effect corresponding to the accumulated number of actions at the time of step S230 is added with reference to the effect addition master table 90. Then, the action for which the determination is received in step S221 is executed (step S231). The information regarding the execution of the action for which the determination is received is transmitted to the terminal apparatus 5 (step S232). Then, the terminal apparatus 5 receives the information regarding the execution of the action for which the determination is received (step S233). Finally, the performance for executing the action is displayed (step S234).

The performance for executing the action is displayed in step S234, and when the virtual battle end condition is satisfied, the virtual battle ends, but when the virtual battle end condition is not satisfied, steps S201 to S234 are repeated until the virtual battle end condition is satisfied.

When the virtual battle end condition is satisfied and the condition for the player to win the virtual battle is also satisfied, a reward that is advantageous for the player to advance the game may be given. The reward that is advantageous for the player to advance the game is, for example, an experience value required for leveling up, points required for strengthening attributes, an item, or the like.

When the virtual battle is started because the third predetermined condition is satisfied, after the condition for ending the virtual battle is satisfied, the game does not shift to the screen other than the virtual battle, and the next virtual battle may be continuously started. Further, at that time, even if the conditions for the player to win the virtual battle is satisfied, the reward may be given after all the consecutive virtual battles are completed. The third predetermined condition may be, for example, that an ally character comes into contact with a plurality of enemy characters at the same time on a screen other than virtual battle, that it is programmed to satisfy the third predetermined condition with a certain probability at the start of virtual battle, or that it is required in a game story.

Further, when the virtual battle is started because the second predetermined condition is satisfied, the sequence of action may be calculated such that all the ally characters execute actions earlier than all the enemy characters when the sequence of action is calculated in step S201. The second predetermined condition may be, for example, that an ally character comes into contact with an enemy character from behind the enemy character on a screen other than virtual battle, that it is programmed to satisfy the second predetermined condition with a certain probability at the start of virtual battle, or that it is required in a game story.

In the eighth embodiment, as the applicable field of the game, the contents described in the fourth embodiment can be adopted within a necessary range.

As an aspect of the eighth embodiment, by calculating a sequence of actions of a plurality of characters when the actions of the characters are determined from a plurality of options, accumulating the number of times of the actions satisfying a first predetermined condition when the action of the character is determined from the plurality of options, displaying the calculated sequence of actions of the plurality of characters, displaying the accumulated number of actions satisfying the first predetermined condition, which is accumulated, receiving determination of the actions of the characters, and causing the character to execute the received action, according to the calculated sequence of actions, it is possible to provide a game program having sufficient strategy and taste.

As an aspect of the eighth embodiment, a sequence of actions including a next action of one action of the character when the one action of the character is determined from the plurality of options is calculated, and the order of action of the next action differs according to the one action, so that it is possible to provide a game having an increased strategy in the action selection and higher taste.

As an aspect of the eighth embodiment, a predetermined effect is added according to the accumulated number of action satisfying the first predetermined condition, so that it is motivated to select actions in consideration of the next sequence of actions, and the taste of the game can be improved.

As an aspect of the eighth embodiment, the sequence of action of the character is calculated according to the element unique to the character, so that it is possible to provide a game with higher taste in which the prediction regarding the sequence of action is not monotonous.

As an aspect of the eighth embodiment, the sequence of action of the character is calculated according to the status, attributes, equipment, and/or belongings of the character, so that it is possible to provide a game with taste which is motivated to adjust the status, attributes, equipment, and/or belongings of the character to be advantageous in terms of the sequence of action, and develops characters strategically.

As an aspect of the eighth embodiment, the number of actions which are executed by the character other than the character operated by the player and satisfy the first predetermined condition is also accumulated together, so that it is possible to provide a game with higher taste from which an effect that cannot be achieved by one player alone can be expected.

As one aspect of the eighth embodiment, a screen showing the action options that can be executed by the character is displayed, when the character executes the first action, the number of actions selectable, which is the number of times that an action can be selected, is increased, when the character executes the second action, the number of actions selectable is decreased, when the character determines the third action, a screen showing the options of actions that can be executed by the character is displayed such that the character can execute actions continuously, so that it is possible to provide a game with higher taste in which various strategies can be adopted regarding the method of selecting an action.

As an aspect of the eighth embodiment, when a character determines a third action, a plurality of screens showing the options of actions that can be executed by the character are displayed such that the character can execute actions continuously, so that it is possible to provide a game having a wider range of strategies regarding the method of selecting an action and higher taste.

As an aspect of the eighth embodiment, a screen showing the options of actions that can be executed by the character is displayed according to the calculated sequence of action, when the number of action selectable corresponding to the character is a predetermined value or less, instead of displaying a screen showing the options of actions that can be executed by the character, a screen showing the options of actions that can be executed by the character next to the character in the calculated sequence of action is displayed, so that it is possible to provide a game with taste in which a disadvantageous situation is assumed depending on the action selection method, and more strategic action selection is required.

As one aspect of the eighth embodiment, the game is a game in which an enemy character and an ally character execute virtual battle, and in the virtual battle, within a predetermined period or a predetermined number of actions, the enemy character and the ally character do not execute actions of a number determined for each character, and the sequence of action of the plurality of characters is calculated such that the number of actions for each character is different, so that it is possible to provide a game with higher taste in which the selected action greatly affects the next sequence of action and more strategy is required.

As an aspect of the eighth embodiment, the game is a game in which an enemy character and an ally character execute virtual battle, and when a second predetermined condition is satisfied, the sequence of action is calculated such that all ally characters, among the plurality of characters, execute the actions earlier than all the enemy characters, so that it is possible to provide a game with higher taste in which virtual battle can be executed under advantageous conditions.

As one aspect of the eighth embodiment, the game is a game in which an enemy character and an ally character execute virtual battle, and the virtual battle is continuously executed when a third predetermined condition is satisfied, so that it is possible to provide a game which becomes more surprising and has higher taste.

As one aspect of the eighth embodiment, the information about the character corresponding to each action is displayed, and the information about the state of the character is displayed together with the information about the character, so that it is possible to provide a game with higher taste in which it becomes easier to recognize the state of the character.

In the eighth embodiment, as "character", "action", "computer apparatus", "sequence of action", and "first predetermined condition", the contents described in the first embodiment can be adopted within a necessary range.

In the eighth embodiment, as the "order of action", the contents described in the second embodiment can be adopted within necessary ranges.

In the eighth embodiment, as the "predetermined effect", the contents described in the third embodiment can be adopted within a necessary range.

In the eighth embodiment, as "elements unique to the character", "characters other than characters operated by the player", "first action", "second action", "third action", "predetermined value", "virtual battle", "predetermined period", "predetermined number of actions", "second predetermined condition", "third predetermined condition", "information about character", and "information about character state", the contents described in the fourth embodiment can be adopted within a necessary range.

In the eighth embodiment, as the "terminal apparatus", the "server apparatus", and the "game", the contents described in the fifth embodiment can be adopted within necessary ranges.

[Appendix]

The description of the embodiments described above has been described so that those having ordinary knowledge in the field to which the invention belongs can carry out the following invention.

[1] A game program that causes a computer apparatus to execute a game that proceeds by determining actions of a plurality of characters from a plurality of options, the game program causing the computer apparatus to function as:

a sequence of action calculator that calculates a sequence of actions of the plurality of characters when an action of a character is determined from the plurality of options;

an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

[2] The game program according to [1], wherein a predetermined value is set for each action of the character, and wherein the sequence of action calculator calculates the sequence of actions such that the order of action of the next action differs, according to a predetermined value of the one action.

[3] The game program according to [1] or [2], causing the computer apparatus to function as:

a number of action accumulator that accumulates a number of actions satisfying a first predetermined condition when the action of the character is determined from the plurality of options; and an accumulated number of action displayer that displays the accumulated number of actions satisfying the first predetermined condition, accumulated by the number of action accumulator.

[4] The game program according to any one of [1] to [3], causing the computer apparatus to function as:

an effect adder that adds a predetermined effect, according to the accumulated number of actions satisfying a first predetermined condition.

[5] The game program according to any one of [1] to [4], wherein the sequence of action calculator calculates the sequence of actions of the characters, according to an element unique to the character.

[6] The game program according to [5], wherein the sequence of action calculator calculates the sequence of actions of the characters, according to a status, an attribute, equipment, and/or a belonging of the character.

[7] The game program according to any one of [1] to [6], causing the computer apparatus to function as:

a sequence of action displayer that displays the sequence of actions of the plurality of characters calculated by the sequence of action calculator.

[8] The game program according to any one of [1] to [7], wherein the number of action accumulator accumulates together with the number of actions satisfying a first predetermined condition, which are executed by a character other than the character operated by the player.

[9] The game program according to any one of [1] to [8], causing the computer apparatus to function as:

an action selection screen displayer that displays a screen showing options of an action that can be executed by the character;

a number of action selectable increaser that increases the number of action selectable which is the number of times that the action can be selected, when the character executes a first action; and a number of action selectable decreaser that reduces the number of action selectable when the character executes a second action, and wherein the action selection screen displayer displays a screen showing options of actions that can be executed by the character such that the character can continuously execute the action, when the character determines a third action.

[10] The game program according to [9], wherein the action selection screen displayer displays a plurality of screens showing options of actions that can be executed by the character such that the character can continuously execute the action, when the character determines the third action.

[11] The game program according to [9], wherein the action selection screen displayer displays a screen showing options of actions that can be executed by the character, according to the sequence of actions calculated by the sequence of action calculator, when the number of action selectable corresponding to the character is less than or equal to a predetermined value, does not display a screen showing the options of actions that can be executed by the character, and displays a screen showing the options of actions that can be executed by a character next to the character in the calculated sequence of actions.

[12] The game program according to any one of [1] to [11], wherein the game is a game in which an enemy character and an ally character execute virtual battle, wherein in the virtual battle, within a predetermined period or a predetermined number of actions, the enemy character and the ally character do not execute actions of a number determined for each character, and wherein the sequence of action calculator calculates the sequence of actions of the plurality of characters such that the number of actions for each character is different,

[13] The game program according to any one of [1] to [12], wherein the game is a game in which an enemy character and an ally character execute virtual battle, and wherein the sequence of action calculator, when a second predetermined condition is satisfied, calculates the sequence of actions such that all ally characters, among the plurality of characters, execute the actions earlier than all the enemy characters.

[14] The game program according to any one of [1] to [13], wherein the game is a game in which an enemy character and an ally character execute virtual battle, and wherein the virtual battle is continuously executed when a third predetermined condition is satisfied.

[15] The game program according to any one of [1] to [14], wherein the sequence of action displayer displays information about the character corresponding to each action, and displays information about a state of the character together with the information about the character.

[16] A computer apparatus comprising:

a sequence of action calculator that calculates a sequence of actions of a plurality of characters when an action of a character is determined from a plurality of options, an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

[17] A proceeding method of a game that is executed in a computer apparatus and proceeds by determining actions of a plurality of characters from a plurality of options, the method comprising:

calculating a sequence of actions of the plurality of characters when an action of a character is determined from the plurality of options;

receiving the determination of the action of the character; and causing the character to execute the received action, according to the calculated sequence of actions, wherein in the calculating the sequence of actions, when one action of the character is determined from the plurality of options, the sequence of actions including a next action of the one action of the character is calculated such that an order of action of the next action differs, according to the one action.

[18] A game program causing a server apparatus to execute a game that proceeds by determining actions of a plurality of characters from a plurality of options, the server apparatus being communicatively connectable to a terminal apparatus operated by a player, the game program causing the server apparatus to function as:

a sequence of action calculator that calculates a sequence of actions of the plurality of characters when an action of a character is determined from the plurality of options;

an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

[19] A server apparatus in which the game program according to [18] is installed.

[20] A game system which includes a terminal apparatus operated by a player and a server apparatus that is communicatively connectable to the terminal apparatus, the game system relating to a game that proceeds by determining actions of a plurality of characters from a plurality of options, the game system comprising:

a sequence of action calculator that calculates a sequence of actions of the plurality of characters when an action of a character is determined from the plurality of options;

an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

[21] A game program causing a terminal apparatus, which is operated by a player and is communicatively connectable to a server apparatus, to execute a game that proceeds by determining actions of a plurality of characters from a plurality of options, the program causing the terminal apparatus to function as:

a sequence of action calculator that calculates a sequence of actions of the plurality of characters when an action of a character is determined from the plurality of options;

an action determination receiver that receives determination of the action of the character; and an action executer that causes the character to execute the action received by the action determination receiver, according to the sequence of actions calculated by the sequence of action calculator, wherein the sequence of action calculator calculates, when one action of the character is determined from the plurality of options, the sequence of actions including a next action of the one action of the character such that an order of action of the next action differs, according to the one action.

[22] A terminal apparatus in which the game program according to [21] is installed.

[23] A proceeding method of a game which is executed in a server apparatus that is communicatively connectable to a terminal apparatus operated by a player and which proceeds by determining actions of a plurality of characters from a plurality of options, the method comprising:

calculating a sequence of actions of the plurality of characters when an action of a character is determined from the plurality of options;

receiving the determination of the action of the character; and causing the character to execute the action received in the receiving determination of the action, according to the calculated sequence of actions;

wherein in the calculating the sequence of actions, when one action of the character is determined from the plurality of options, the sequence of actions including a next action of the one action of the character is calculated such that an order of action of the next action differs, according to the one action.

[24] A proceeding method of a game which is executed in a game system including a terminal apparatus operated by a player and a server apparatus being communicatively connectable to the terminal apparatus and which proceeds by determining actions of a plurality of characters from a plurality of options, the method comprising:

calculating a sequence of actions of the plurality of characters when an action of a character is determined from the plurality of options, by the terminal apparatus or the server apparatus;

receiving the determination of the action of the character, by the terminal apparatus or the server apparatus; and causing the character to execute the action received in the receiving determination of the action, according to the calculated sequence of actions, by the terminal apparatus or the server apparatus, wherein in the calculating the sequence of actions, by the terminal apparatus or the server apparatus, when one action of the character is determined from the plurality of options, the sequence of actions including a next action of the one action of the character is calculated such that an order of action of the next action differs, according to the one action.

The invention claimed is:

1. A non-transitory computer-readable recording medium comprising a game program, the game program causing a computer apparatus to execute a game, the game proceeding by determining actions of a plurality of characters from a plurality of options, the game program causing the computer apparatus to:
calculate an initial sequence of actions of the plurality of characters;
receive a selection of an action of a first character of the plurality of characters, the first character being specified by the initial sequence of actions, the action being selected from among the plurality of options;
cause the first character to execute the action;
calculate, when the action of the first character is selected from the plurality of options, a new sequence of actions that specifies an order of next actions of the plurality of player characters such that the order of the next actions of the new sequence of actions differs from an order of next actions of the original sequence of actions, according to the action executed by the first character; and update the initial sequence of actions of the plurality of characters based on the new sequence of actions.

2. The non-transitory computer-readable recording medium according to claim 1,
wherein a predetermined value is set for the action of the first character, and
wherein the new sequence of actions is calculated such that the order of next actions differs, according to the predetermined value of the action.

3. The non-transitory computer-readable recording medium according to claim 1, the game program further causing the computer apparatus to:
accumulate a number of actions satisfying a first predetermined condition when the action of the first character is selected from the plurality of options; and
display, on a display, the accumulated number of actions satisfying the first predetermined condition.

4. The non-transitory computer-readable recording medium according to claim 3, the game program further causing the computer apparatus to:
add a predetermined effect, according to the accumulated number of actions satisfying the first predetermined condition.

5. The non-transitory computer-readable recording medium according to claim 3,
wherein the number of actions satisfying the first predetermined condition are accumulated together with actions which are executed by a second character other than the first character.

6. The non-transitory computer-readable recording medium according to claim 1,
wherein the initial sequence of actions of the plurality of characters is calculated according to an element unique to the first character.

7. The non-transitory computer-readable recording medium according to claim 1, the game program further causing the computer apparatus to:
display, on a display, the initial sequence of actions of the plurality of characters.

8. The non-transitory computer-readable recording medium according to claim 1,
wherein the initial sequence of actions of the plurality of characters is calculated according to a status, an attribute, equipment, and/or a belonging of the first character.

9. The non-transitory computer-readable recording medium according to claim 1, the game program further causing the computer apparatus to:
display, on a display, a screen showing the plurality of options that can be executed by the first character;
increase a number of action selectable, which is a number of times that the action can be selected, when the first character executes a first action;
reduce the number of action selectable when the character executes a second action; and
display, on the display, a screen showing options of actions that can be executed by the character such that the character can continuously execute the action, when the character selects a third action.

10. The non-transitory computer-readable recording medium according to claim 9, the game program further causing the computer apparatus to:
display, on the display, a plurality of screens showing options of actions that can be executed by the character such that the character can continuously execute the action, when the character selects the third action.

11. The non-transitory computer-readable recording medium according to claim 9, the game program further causing the computer apparatus to:
display, on the display, a screen showing options of actions that can be executed by the character, according to the initial sequence of actions;
when the number of action selectable corresponding to the character is less than or equal to a predetermined value, not display the screen showing the options of actions that can be executed by the character; and
display, on the display, a screen showing the options of actions that can be executed by a character next to the character in the initial sequence of actions.

12. The non-transitory computer-readable recording medium according to claim 1,
wherein the game includes an enemy character and an ally character that execute a virtual battle,
wherein in the virtual battle, within a predetermined period or a predetermined number of actions, the enemy character and the ally character do not execute actions of a number determined for each character, and
wherein the initial sequence of actions of the plurality of characters is calculated such that the number determined for each character is different.

13. The non-transitory computer-readable recording medium according to claim 1,
wherein the game includes enemy characters and ally characters that execute a virtual battle, and
wherein, when a predetermined condition is satisfied, the initial sequence of actions is calculated such that all of the ally characters, among the plurality of characters, execute actions earlier than all of the enemy characters.

14. The non-transitory computer-readable recording medium according to claim 1,
wherein the game includes an enemy character and an ally character that execute a virtual battle, and
wherein the virtual battle is continuously executed when a predetermined condition is satisfied.

15. The non-transitory computer-readable recording medium according to claim 1, the game program further causing the computer apparatus to:
display, on a display, information about the character corresponding to each of the plurality of options, and
display, on the display, information about a state of the character together with the information about the character.

16. The non-transitory computer-readable recording medium according to claim 1, the game program further causing the computer apparatus to:
display the initial sequence of actions of the plurality of characters on a display; and
update, on the display, the initial sequence of actions of the plurality of characters based on the new sequence of actions.

17. A computer apparatus, comprising:
a processor; and
a memory including a program that, when executed by the processor, causes the processor to perform operations, the operations including:
calculating an initial sequence of actions of a plurality of characters;
receiving a selection of an action of a first character of the plurality of characters, the first character being specified by the initial sequence of actions, the action being selected from among a plurality of options;
causing the first character to execute the action;

calculating, when the action of the first character is selected from the plurality of options, a new sequence of actions that specifies an order of next actions of the plurality of player characters such that the order of the next actions of the new sequence of actions differs from an order of next actions of the original sequence of actions, according to the action executed by the first character; and updating the initial sequence of actions of the plurality of characters based on the new sequence of actions.

18. The computer apparatus according to claim 17, the operations further including:

displaying the initial sequence of actions of the plurality of characters on a display; and updating, on the display, the initial sequence of actions of the plurality of characters based on the new sequence of actions.

19. A method of proceeding a game, the game being executed in a computer apparatus, the game proceeding by determining actions of a plurality of characters from a plurality of options, the method comprising:

calculating, by a processor of the computer apparatus, an initial sequence of actions of the plurality of characters;

receiving, via an interface of the computer apparatus, a selection of an action of a first character of the plurality of characters, the first character being specified by the initial sequence of actions, the action being selected from among the plurality of options;

causing, by the processor, the first character to execute the action;

calculating, by the processor, when the action of the first character is selected from the plurality of options, a new sequence of actions that specifies an order of next actions of the plurality of player characters such that the order of the next actions of the new sequence of actions differs from an order of next actions of the original sequence of actions, according to the action executed by the first character; and update, by the processor, the initial sequence of actions of the plurality of characters based on the new sequence of actions.

20. The method according to claim 19, further comprising:

display, on a display of the computer apparatus, the initial sequence of actions of the plurality of characters; and updating, on the display, the initial sequence of actions of the plurality of characters based on the new sequence of actions.

* * * * *